US012780301B2

(12) United States Patent
Edamoto et al.

(10) Patent No.: US 12,780,301 B2
(45) Date of Patent: Nov. 3, 2026

(54) STEERING DEVICE

(71) Applicant: JTEKT CORPORATION, Kariya (JP)

(72) Inventors: Syouma Edamoto, Ikoma (JP); Tsutomu Tamura, Nara (JP); Robert Fuchs, Nara (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 19/161,627

(22) PCT Filed: Mar. 1, 2023

(86) PCT No.: PCT/JP2023/007683
§ 371 (c)(1),
(2) Date: Sep. 2, 2025

(87) PCT Pub. No.: WO2024/180745
PCT Pub. Date: Sep. 6, 2024

(65) Prior Publication Data

US 2026/0241989 A1 Aug. 20, 2026

(51) Int. Cl.
*B62D 6/00* (2006.01)
*B62D 15/02* (2006.01)

(52) U.S. Cl.
CPC ........... *B62D 6/00* (2013.01); *B62D 15/0255* (2013.01)

(58) Field of Classification Search
CPC .... B62D 6/00; B62D 15/0255; B62D 15/025; B60W 50/16
See application file for complete search history.

(56) References Cited

U.S. PATENT DOCUMENTS

2015/0353127 A1* 12/2015 Takeda .................. B62D 6/008 701/41
2017/0061799 A1* 3/2017 Fujii .................. B62D 15/0255
(Continued)

FOREIGN PATENT DOCUMENTS

JP 2013-82438 A 5/2013
JP 2013-184590 A 9/2013
(Continued)

OTHER PUBLICATIONS

May 23, 2023 International Search Report issued in International Patent Application No. PCT/JP2023/007683.
(Continued)

*Primary Examiner* — Sizo B Vilakazi
(74) *Attorney, Agent, or Firm* — Oliff PLC

(57) ABSTRACT

A motor control device includes: a steering member; an electric motor that drives a steering operation mechanism; a manual steering command value generation unit that generates a manual steering command value using steering torque; an integrated angle command value calculation unit that calculates an integrated angle command value by adding the manual steering command value to an automatic steering command value for driving assistance; and a motor control unit that controls the electric motor based on the integrated angle command value. The manual steering command value generation unit is configured to generate the manual steering command value based on an equation of motion including road reaction force characteristic coefficients. The motor control device further includes a road reaction force characteristic change unit that, when a direction change command is input by a driver operation, increases a value of at least one road reaction force characteristic coefficient out of the road reaction force characteristic coefficients as com-
(Continued)

pared to a value before the direction change command is input.

7 Claims, 15 Drawing Sheets

(56) References Cited

U.S. PATENT DOCUMENTS

| | | | | |
|---|---|---|---|---|
| 2018/0086341 | A1* | 3/2018 | Taniguchi | B62D 15/025 |
| 2020/0039576 | A1* | 2/2020 | Shoji | B62D 15/025 |
| 2020/0269906 | A1* | 8/2020 | Nakade | B62D 5/0463 |
| 2022/0227412 | A1* | 7/2022 | Akatsuka | B62D 5/0469 |
| 2024/0278650 | A1* | 8/2024 | Shoji | B60L 15/20 |
| 2024/0416991 | A1* | 12/2024 | Edamoto | B62D 5/0463 |

FOREIGN PATENT DOCUMENTS

| | | | |
|---|---|---|---|
| JP | 2015-009644 | A | 1/2015 |
| JP | 2020-132025 | A | 8/2020 |
| WO | 2014/109151 | A1 | 7/2014 |
| WO | 2016/162902 | A1 | 10/2016 |

OTHER PUBLICATIONS

Aug. 28, 2025 International Preliminary Report on Patentability issued in International Patent Application No. PCT/JP2023/007683.
Mar. 26, 2026 Partial Supplementary Search Report issued in European Patent Application No. 23925300.8.
Jun. 23, 2026 Extended Search Report issued in European Patent Application No. 23925300.8.

* cited by examiner

STEERING DEVICE

TECHNICAL FIELD

The present invention relates to a steering system.

BACKGROUND ART

Paragraph 0069 of Patent Document 1 describes that, when a turn signal switch is ON, determination is made that a lane change is being performed, and a road condition gain is reduced to reduce additional reaction torque, thereby facilitating the lane change.

RELATED ART DOCUMENTS

Patent Documents

Patent Document 1: Japanese Unexamined Patent Application Publication No. 2013-82438 (JP 2013-82438 A)

SUMMARY OF THE INVENTION

Problem to be Solved by the Invention

In the case where the additional reaction torque is reduced when the turn signal switch is ON as in the invention described in Patent Document 1, a steering reaction force that is a reaction force to a manual operation of a driver decreases. Therefore, it is not clear to the driver as to when and how a target travel lane in autonomous driving will be switched after the turn signal switch is operated. Thus, the driver may feel uneasy or uncomfortable.

Further, there is a problem in that the amount of change in the additional reaction torque (steering reaction force) when the target travel lane in the autonomous driving is switched is small, and the driver hardly notices that the target driving lane in the autonomous driving has been switched.

An object of the present invention is to provide a steering system with which a driver easily notices that a target travel lane in autonomous driving (driving assistance) has been switched.

Means for Solving the Problem

One embodiment of the present invention provides a motor control device that controls drive of an electric motor for steering angle control. The motor control device includes: a manual steering command value generation unit that generates a manual steering command value using steering torque; an integrated angle command value calculation unit that calculates an integrated angle command value by adding the manual steering command value to an automatic steering command value for driving assistance; and a motor control unit that controls the electric motor based on the integrated angle command value. The manual steering command value generation unit is configured to generate the manual steering command value based on an equation of motion including road reaction force characteristic coefficients. The motor control device further includes a road reaction force characteristic change unit that, when a direction change command is input by a driver operation, increases a value of at least one road reaction force characteristic coefficient out of the road reaction force characteristic coefficients as compared to a value before the direction change command is input.

With this configuration, the driver easily notices that the target travel lane in the autonomous driving (driving assistance) has been switched.

One embodiment of the present invention is a motor control device that controls drive of an electric motor for steering angle control. The motor control device includes: an assist torque command value generation unit that generates an assist torque command value using steering torque; a manual steering command value generation unit that generates a manual steering command value using the steering torque and the assist torque command value; an integrated angle command value calculation unit that calculates an integrated angle command value by adding the manual steering command value to an automatic steering command value for driving assistance; and a switching unit that switches control between first control for controlling the electric motor based on the assist torque command value and second control for controlling the electric motor based on the integrated angle command value. The switching unit is configured to switch the control to the second control when a direction change command is input by a driver operation while the control is the first control, and to switch the control to the first control when a predetermined condition is satisfied after the control is switched to the second control.

With this configuration, the driver easily notices that the target travel lane in the autonomous driving (driving assistance) has been switched.

The above and other objects, features, and effects of the present invention will become apparent from the following description of an embodiment that will be given with reference to the accompanying drawings.

MODES FOR CARRYING OUT THE INVENTION

Description of Embodiment of Invention

Figure 1:
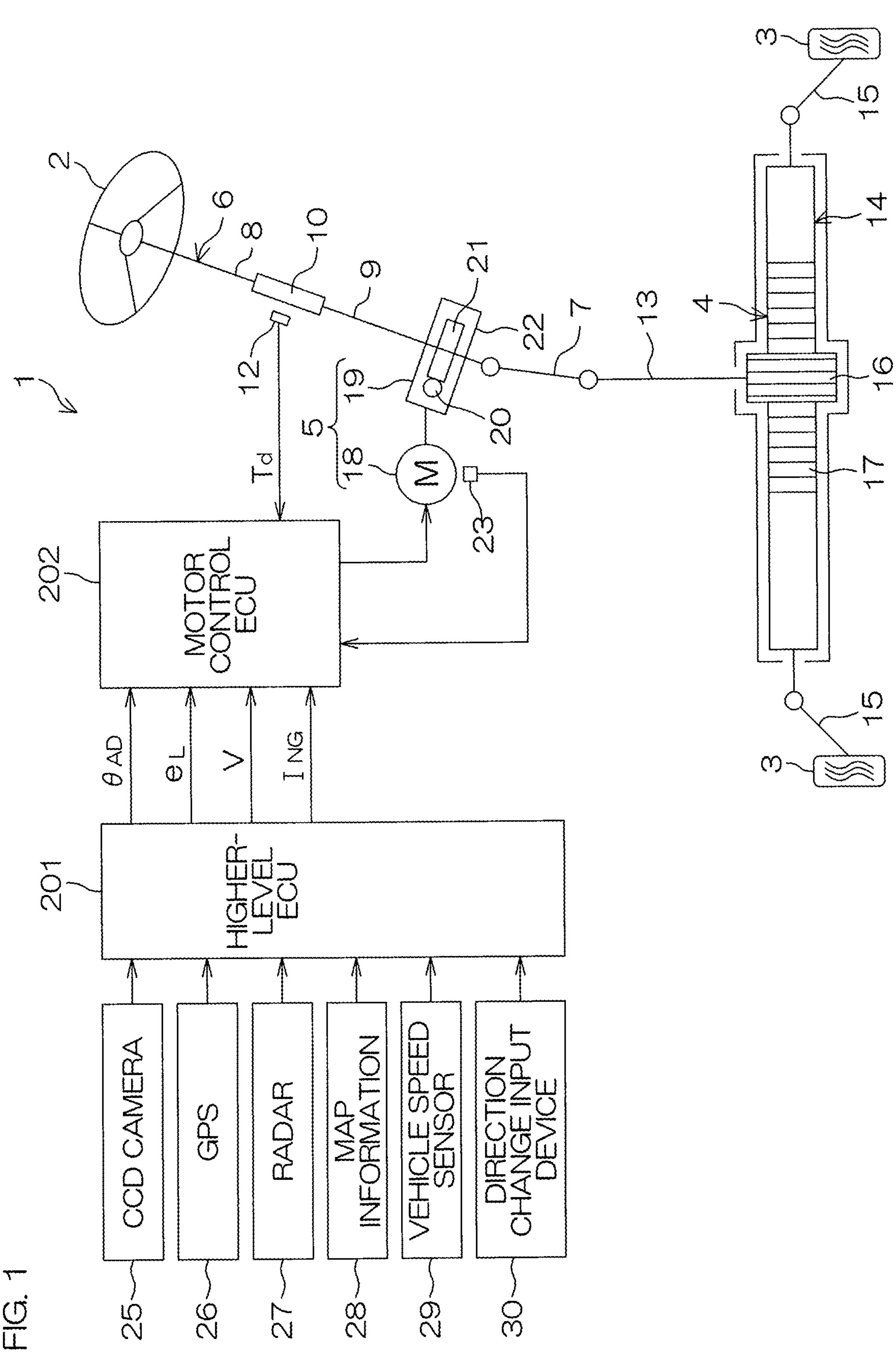
FIG. 1 is a schematic diagram showing a schematic configuration of an electric power steering system to which a motor control device according to a first embodiment of the present disclosure is applied.

One embodiment of the present invention provides a motor control device that controls drive of an electric motor for steering angle control. The motor control device includes: a manual steering command value generation unit that generates a manual steering command value using steering torque; an integrated angle command value calculation unit that calculates an integrated angle command value by adding the manual steering command value to an automatic steering command value for driving assistance; and a motor control unit that controls the electric motor based on the integrated angle command value. The manual steering command value generation unit is configured to generate the manual steering command value based on an equation of motion including road reaction force characteristic coefficients. The motor control device further includes a road reaction force characteristic change unit that, when a direction change command is input by a driver operation, increases a value of at least one road reaction force characteristic coefficient out of the road reaction force characteristic coefficients as compared to a value before the direction change command is input.

With this configuration, the driver easily notices that the target travel lane in the autonomous driving (driving assistance) has been switched.

In one embodiment of the present invention, the road reaction force characteristic coefficients include a virtual load spring stiffness coefficient and a virtual load viscous damping coefficient, and the road reaction force characteristic change unit is configured to, when the direction change command is input, increase a value of at least one of the virtual load spring stiffness coefficient and the virtual load viscous damping coefficient as compared to a value before the direction change command is input.

In one embodiment of the present invention, the road reaction force characteristic change unit maintains the value of the at least one road reaction force characteristic coefficient out of the road reaction force characteristic coefficients at a value larger than the value before the direction change command is input during a period from a start of input of the direction change command to satisfaction of a lane change approval condition for switching the automatic steering command value from an automatic steering command value for causing a vehicle to travel along a current lane to an automatic steering command value for causing the vehicle to travel along an adjacent lane according to the direction change command.

In one embodiment of the present invention, the lane change approval condition is set using a distance between a center line of the current lane and a reference position of the vehicle.

In one embodiment of the present invention, the lane change approval condition is set using a difference between an actual steering angle and the automatic steering command value.

One embodiment of the present invention is a motor control device that controls drive of an electric motor for steering angle control. The motor control device includes: an assist torque command value generation unit that generates an assist torque command value using steering torque; a manual steering command value generation unit that generates a manual steering command value using the steering torque and the assist torque command value; an integrated angle command value calculation unit that calculates an integrated angle command value by adding the manual steering command value to an automatic steering command value for driving assistance; and a switching unit that switches control between first control for controlling the electric motor based on the assist torque command value and second control for controlling the electric motor based on the integrated angle command value. The switching unit is configured to switch the control to the second control when a direction change command is input by a driver operation while the control is the first control, and to switch the control to the first control when a predetermined condition is satisfied after the control is switched to the second control.

With this configuration, the driver easily notices that the target travel lane in the autonomous driving (driving assistance) has been switched.

In one embodiment of the present invention, after the control is switched to the second control, the switching unit maintains the second control at least until satisfaction of a lane change approval condition for switching the automatic steering command value from an automatic steering command value for causing a vehicle to travel along a current lane to an automatic steering command value for causing the vehicle to travel along an adjacent lane according to the direction change command.

Detailed Description of Embodiment of Invention

An embodiment of the present invention will be described in detail below with reference to the accompanying drawings.

[1] Schematic Configuration of Electric Power Steering System

FIG. 1 is a schematic diagram showing a schematic configuration of an electric power steering system to which a motor control device according to a first embodiment of the present invention is applied.

An electric power steering system 1 includes: a steering wheel 2 that is a steering member for steering a vehicle; a steering operation mechanism 4 that steers steered wheels 3 in conjunction with rotation of the steering wheel 2; and a steering assist mechanism 5 that assists a driver in steering. The steering wheel 2 and the steering operation mechanism 4 are mechanically connected via a steering shaft 6 and an intermediate shaft 7.

The steering shaft 6 includes an input shaft 8 connected to the steering wheel 2 and an output shaft 9 connected to the intermediate shaft 7. The input shaft 8 and the output shaft 9 are connected via a torsion bar 10 so as to be rotatable relative to each other.

A torque sensor 12 is disposed near the torsion bar 10. The torque sensor 12 detects steering torque (torsion bar torque) $T_d$ applied to the steering wheel 2 based on the amount of relative rotational displacement between the input shaft 8 and the output shaft 9. In the present embodiment, the steering torque $T_d$ that is detected by the torque sensor 12 is such that, for example, the torque for steering to the right is detected as a positive value and the torque for steering to the left is detected as a negative value. It is herein assumed that the magnitude of the steering torque $T_d$ increases as the absolute value thereof increases.

The steering operation mechanism 4 is a rack and pinion mechanism including a pinion shaft 13 and a rack shaft 14 that is a steered shaft. The steered wheels 3 are connected to the ends of the rack shaft 14 via tie rods 15 and knuckle arms (not shown). The pinion shaft 13 is connected to the intermediate shaft 7. The pinion shaft 13 is configured to rotate in conjunction with steering of the steering wheel 2. A pinion 16 is connected to a distal end of the pinion shaft 13.

The rack shaft 14 extends linearly along a right-left direction of the vehicle. A rack 17 that meshes with the pinion 16 is formed on an intermediate portion of the rack shaft 14 in an axial direction. The pinion 16 and the rack 17 convert rotation of the pinion shaft 13 into axial movement of the rack shaft 14. The steered wheels 3 can be steered by moving the rack shaft 14 in the axial direction.

When the steering wheel 2 is steered (rotated), this rotation is transmitted to the pinion shaft 13 via the steering shaft 6 and the intermediate shaft 7. The pinion 16 and the rack 17 then convert rotation of the pinion shaft 13 into axial movement of the rack shaft 14. The steered wheels 3 are thus steered.

The steering assist mechanism 5 includes an electric motor 18 that generates a steering assist force (assist torque), and a speed reducer 19 that amplifies output torque of the electric motor 18 and transmits the amplified torque to the steering operation mechanism 4. The speed reducer 19 is a worm gear mechanism including a worm gear 20 and a worm wheel 21 that meshes with the worm gear 20. The speed reducer 19 is housed in a gear housing 22 that is a transmission mechanism housing. Hereinafter, the reduction ratio (gear ratio) of the speed reducer 19 is sometimes represented by N. The reduction ratio N is defined as the ratio $\theta_{wg}/\theta_{ww}$ of a rotational angle $\theta_{wg}$ of the worm gear 20 to a rotational angle $\theta_{ww}$ of the worm wheel 21.

The worm gear 20 is rotationally driven by the electric motor 18. The worm wheel 21 is connected to the output shaft 9 so as to be rotatable together.

When the worm gear 20 is rotationally driven by the electric motor 18, the worm wheel 21 is rotationally driven so that motor torque is applied to the steering shaft 6 and the steering shaft 6 (output shaft 9) is rotated. The rotation of the steering shaft 6 is then transmitted to the pinion shaft 13 via the intermediate shaft 7. Rotation of the pinion shaft 13 is converted into axial movement of the rack shaft 14.

The steered wheels 3 are thus steered. That is, rotationally driving the worm gear 20 using the electric motor 18 enables steering assist by the electric motor 18 and steering of the steered wheels 3. The electric motor 18 is provided with a rotational angle sensor 23 for detecting the rotational angle of a rotor of the electric motor 18.

The torque that is applied to the output shaft 9 (example of an object to be driven by the electric motor 18) includes motor torque from the electric motor 18 and disturbance torque other than the motor torque. Disturbance torque $T_{lc}$ other than the motor torque includes the steering torque $T_d$, road reaction torque (road load torque) Tri, and friction torque $T_f$.

The steering torque $T_d$ is torque that is applied from the steering wheel 2 side to the output shaft 9 due to a force that is applied to the steering wheel 2 by the driver, a force that is generated by steering inertia, etc.

The road reaction torque $T_{rl}$ is torque that is applied from the steered wheel 3 side to the output shaft 9 via the rack shaft 14 due to self-aligning torque that is exerted on tires, a force that is generated by a suspension and tire wheel alignment, a friction force of the rack and pinion mechanism, etc.

The vehicle is equipped with a CCD (Charge Coupled Device) camera 25 that captures an image of the road ahead in the direction of travel of the vehicle, a GPS (Global Positioning System) 26 that detects the location of the vehicle, a radar 27 that detects a road shape and obstacles, a map information memory 28 storing map information, a vehicle speed sensor 29 that detects a vehicle speed V, a direction change input device 30, etc.

The CCD camera 25, the GPS 26, the radar 27, the map information memory 28, the vehicle speed sensor 29, and the direction change input device 30 are connected to a higher-level ECU (ECU: Electronic Control Unit) 201 that performs driving assistance control and autonomous driving control. The higher-level ECU 201 performs perception of the surroundings, vehicle self-localization, route planning, etc. based on information obtained by the CCD camera 25, the GPS 26, the radar 27, the vehicle speed sensor 29, and the direction change input device 30 and the map information, and determines control target values for steering and drive actuators.

In the present embodiment, the higher-level ECU 201 sets an automatic steering command value $\theta_{AD}$ for driving assistance (automatic steering). In the present embodiment, the driving assistance is lane centering assist (LCA) for causing the vehicle to travel along the center of its lane. The automatic steering command value $\theta_{AD}$ is a target value of the steering angle for causing the vehicle to travel along a target travel line (lane center line).

In the present embodiment, the automatic steering command value $\theta_{AD}$ is expressed as a rotational amount (rotational angle) from a neutral position of the output shaft 9. The rotational amount in a rightward steering direction from the neutral position is expressed as a positive value, and the rotational amount in a leftward steering direction from the neutral position is expressed as a negative value. The automatic steering command value OAD is set based on, for example, the vehicle speed, the lateral deviation from the target travel line (lane center line), and the yaw deviation of the vehicle from the target travel line. A process of setting such an automatic steering command value $\theta_{AD}$ is well known, and therefore will not be described in detail herein.

In the present embodiment, the higher-level ECU 201 sets a first automatic steering command value $\theta_{AD1}$, a second automatic steering command value $\theta_{AD2}$, and a third automatic steering command value $\theta_{AD3}$ as the automatic steering command value $\theta_{AD}$.

The first automatic steering command value $\theta_{AD1}$ is an automatic steering command value for causing the vehicle to travel along the center line of a lane where the vehicle is currently traveling (hereinafter referred to as "current lane"). The second automatic steering command value $\theta_{AD2}$ is an automatic steering command value for causing the vehicle to travel along the center line of a lane adjacent to the current lane on the right side (hereinafter referred to as "right lane"). The third automatic steering command value $\theta_{AD3}$ is an automatic steering command value for causing the vehicle to travel along the center line of a lane adjacent to the current lane on the left side (hereinafter referred to as "left lane"). That is, the automatic steering command values $\theta_{AD1}$, $\theta_{AD2}$, $\theta_{AD3}$ are target values of steering angles for causing the vehicle to automatically travel along the center lines of the respective lanes.

When there is no right lane relative to the current lane, the second automatic steering command value $\theta_{AD2}$ is not set. When there is no left lane relative to the current lane, the third automatic steering command value $\theta_{AD3}$ is not set.

The higher-level ECU 201 outputs a lateral deviation $e_L$ from a currently set target travel line. In the present embodiment, the lateral deviation $e_L$ is a distance from the currently set target travel line (lane center line) to a reference position of the vehicle (hereinafter referred to as "reference vehicle position"). The reference vehicle position is set as a predetermined position at the width center of the vehicle.

In the present embodiment, the lateral deviation $e_L$ is 0 ($e_L$=θ) when the reference vehicle position is on the target travel line, a positive value ($e_L$>θ) when the reference vehicle position is rightward of the target travel line in the advancing direction, and a negative value ($e_L$<θ) when the reference vehicle position is leftward of the target travel line in the advancing direction.

The direction change input device 30 includes, for example, a turn signal lever for operating a direction indicator. When turning right or left or changing lanes, the driver inputs a direction change command by operating the turn signal lever. When the driver operates the turn signal lever, a rightward direction change command or a leftward direction change command is input. When the turn signal lever is tilted from a direction indicator OFF position that is a normal position to a direction indicator ON position, the input of the direction change command is started. When the turn signal lever is returned to the direction indicator OFF position, the input of the direction change command is stopped. That is, the direction change command is continuously input while the turn signal lever is tilted in the direction indicator ON position.

The higher-level ECU 201 provides a direction change command $I_{NG}$ corresponding to the direction change command input by the direction change input device 30 to a motor control ECU 202. In the present embodiment, the direction change command $I_{NG}$ provided to the motor control ECU 202 takes a value of 0, 1, or 2. $I_{NG}$=0 indicates that the turn signal lever is not operated. $I_{NG}$=1 indicates that a rightward direction change command is input. $I_{NG}$=2 indicates that a leftward direction change command is input.

The higher-level ECU 201 performs a command value selection process for selecting one of the automatic steering command values $\theta_{AD1}$, $\theta_{AD2}$, $\theta_{AD3}$ using the direction change command etc. The command value selection process will be described in detail later. The automatic steering command value selected by the command value selection process will be referred to as the automatic steering command value $\theta_{AD}$.

The automatic steering command value $\theta_{AD}$, the lateral deviation $e_L$, the vehicle speed V, and the direction change command $I_{NG}$ are provided to the motor control ECU 202 via an in-vehicle network. The steering torque $T_d$ detected by the torque sensor 12 and an output signal of the rotational angle sensor 23 are input to the motor control ECU 202. The motor control ECU 202 controls the electric motor 18 based on these input signals and information provided from the higher-level ECU 201.

[2] Electrical Configuration of Motor Control ECU 202

Figure 2:
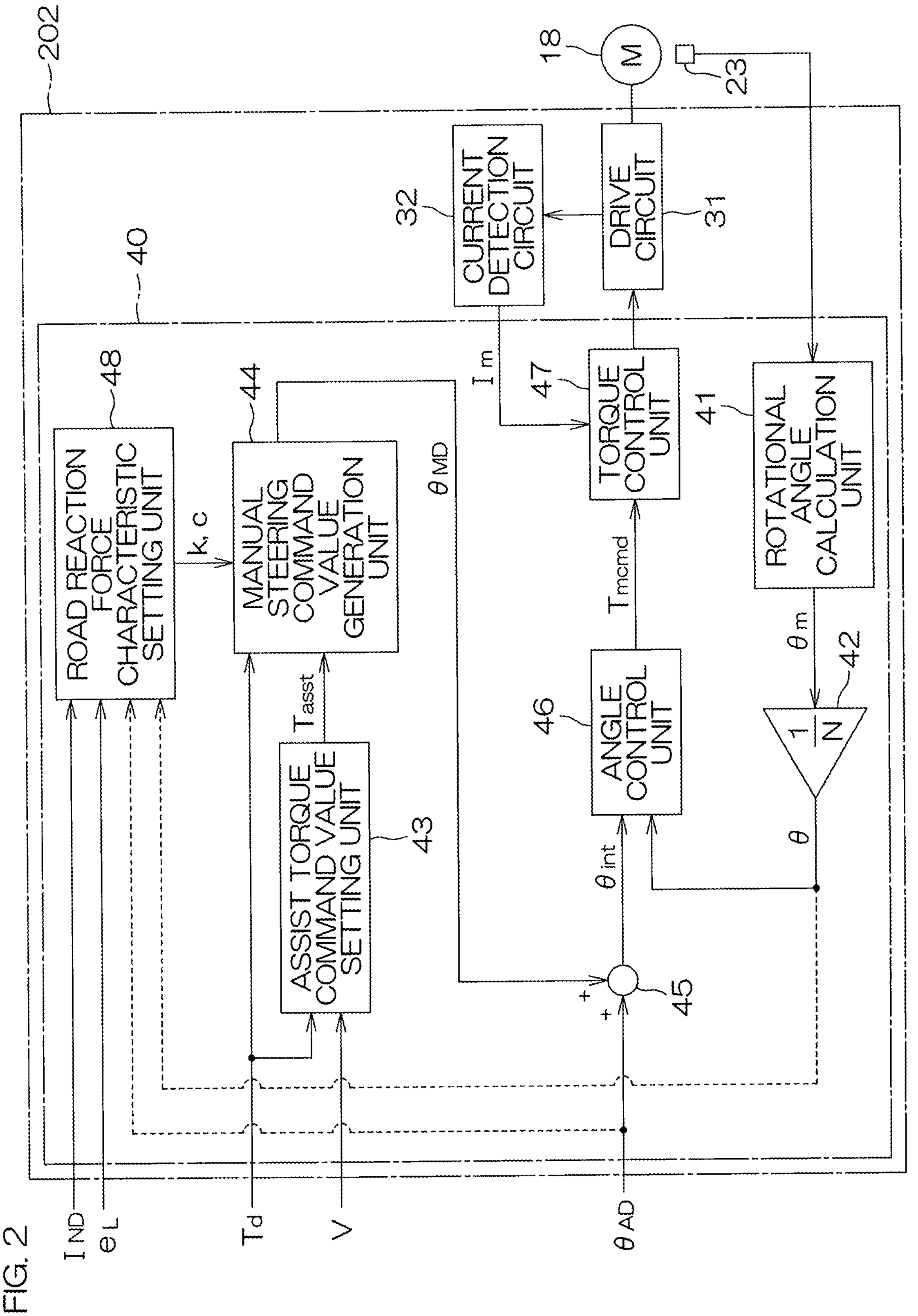
FIG. 2 is a block diagram illustrating an electrical configuration of a motor control ECU.

FIG. 2 is a block diagram illustrating an electrical configuration of the motor control ECU 202.

The motor control ECU 202 includes a microcomputer 40, a drive circuit (inverter circuit) 31 that is controlled by the microcomputer 40 and supplies electric power to the electric motor 18, and a current detection circuit 32 that detects a current (hereinafter referred to as "motor current $I_m$") that flows through the electric motor 18.

The microcomputer 40 includes a CPU and a memory (such as a ROM, a RAM, and a non-volatile memory), and functions as a plurality of functional processing units by executing a predetermined program.

The plurality of functional processing units includes a rotational angle calculation unit 41, a reduction ratio division unit 42, an assist torque command value setting unit 43, a manual steering command value generation unit 44, an integrated angle command value calculation unit 45, an angle control unit 46, a torque control unit (current control unit) 47, and a road reaction force characteristic setting unit 48.

The rotational angle calculation unit 41 calculates a rotor rotational angle $\theta_m$ of the electric motor 18 based on an output signal from the rotational angle sensor 23. The reduction ratio division unit 42 converts the rotor rotational angle $\theta_m$ into a rotational angle (actual steering angle) θ of the output shaft 9 by dividing the rotor rotational angle $\theta_m$ by the reduction ratio N. In the present embodiment, the actual steering angle θ is expressed as a rotational amount (rotational angle) from the neutral position of the output shaft 9. The rotational amount in the rightward steering direction from the neutral position is expressed as a positive value, and the rotational amount in the leftward steering direction from the neutral position is expressed as a negative value.

The road reaction force characteristic setting unit 48 sets a virtual load spring stiffness coefficient k and a virtual load viscous damping coefficient c to be used by the manual steering command value generation unit 44. The road reaction force characteristic setting unit 48 is an example of "road reaction force characteristic change unit" according to the present invention. The operation of the road reaction force characteristic setting unit 48 will be described in detail later.

Figure 3:
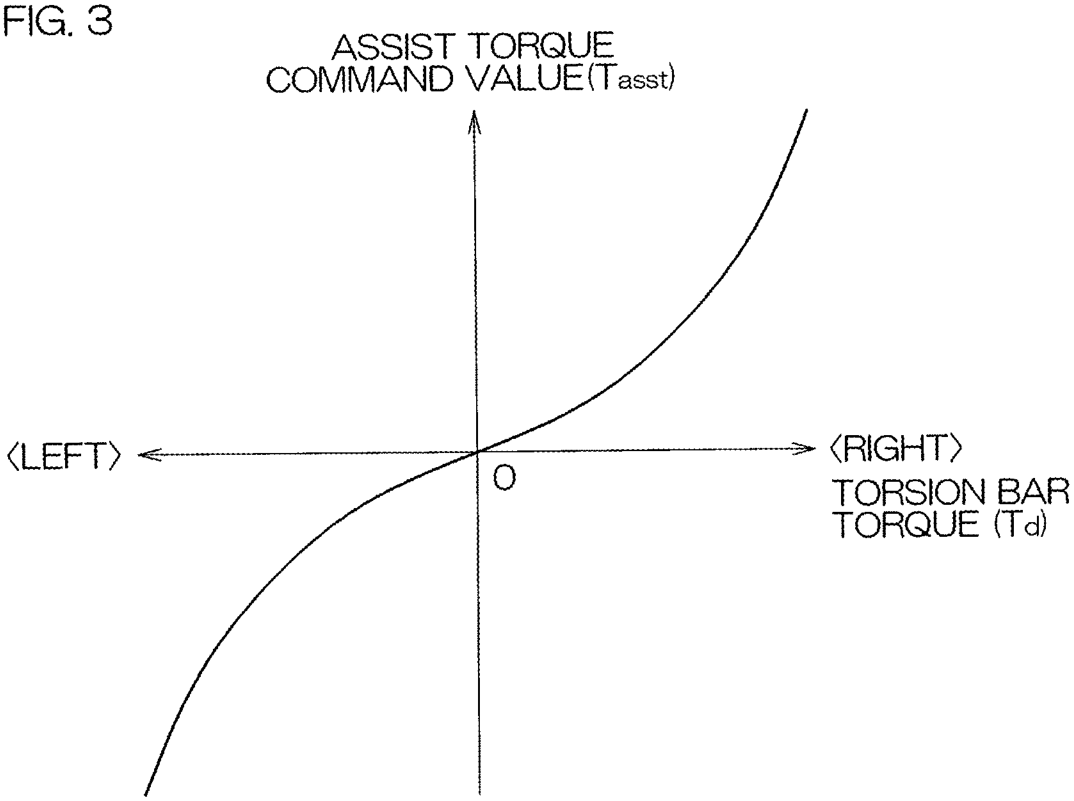
FIG. 3 is a graph showing an example of setting an assist torque command value $T_{asst}$ with respect to steering torque $T_d$.

The assist torque command value setting unit 43 sets an assist torque command value $T_{asst}$ that is a target value of the assist torque necessary for a manual operation. The assist torque command value setting unit 43 sets the assist torque command value $T_{asst}$ based on the vehicle speed V provided from the higher-level ECU 201 and the steering torque $T_d$ detected by the torque sensor 12. An example of setting the assist torque command value $T_{asst}$ with respect to the steering torque $T_d$ is shown in FIG. 3.

The assist torque command value $T_{asst}$ is set to a positive value when the electric motor 18 should generate a steering assist force for steering to the right, and is set to a negative value when the electric motor 18 should generate a steering assist force for steering to the left. The assist torque command value $T_{asst}$ is positive for a positive value of the steering torque $T_d$, and is negative for a negative value of the steering torque $T_d$.

The assist torque command value $T_{asst}$ is set such that its absolute value increases as the absolute value of the steering torque $T_d$ increases and its absolute value decreases as the vehicle speed V increases.

The assist torque command value setting unit 43 may calculate the assist torque command value $T_{asst}$ by multiplying the steering torque $T_d$ by a preset constant.

The manual steering command value generation unit 44 is provided to, when the driver operates the steering wheel 2, set the steering angle (more exactly, the rotational angle θ of the output shaft 9) according to the steering wheel operation as a manual steering command value $\theta_{MD}$. The manual steering command value generation unit 44 generates the manual steering command value $\theta_{MD}$ using the steering torque $T_d$ detected by the torque sensor 12, the assist torque command value $T_{asst}$ set by the assist torque command value setting unit 43, and the virtual load spring stiffness coefficient k and the virtual load viscous damping coefficient c set by the road reaction force characteristic setting unit 48. The manual steering command value generation unit 44 will be described in detail later.

The integrated angle command value calculation unit 45 calculates an integrated angle command value $\theta_{int}$ by adding the manual steering command value $\theta_{MD}$ to the automatic steering command value $\theta_{AD}$ set by the higher-level ECU 201.

The angle control unit 46 calculates a motor torque command value $T_{memd}$ according to the integrated angle command value $\theta_{int}$ based on the integrated angle command value $\theta_{int}$. The angle control unit 46 will be described in detail later.

The torque control unit 47 drives the drive circuit 31 such that the motor torque of the electric motor 18 is brought closer to the motor torque command value $T_{memd}$. The torque control unit 47 will be described in detail later.

[2.1] Description of Manual Steering Command Value Generation Unit 44

In the present embodiment, the manual steering command value generation unit 44 uses a reference EPS model to set the manual steering command value $\theta_{MD}$.

Figure 4:
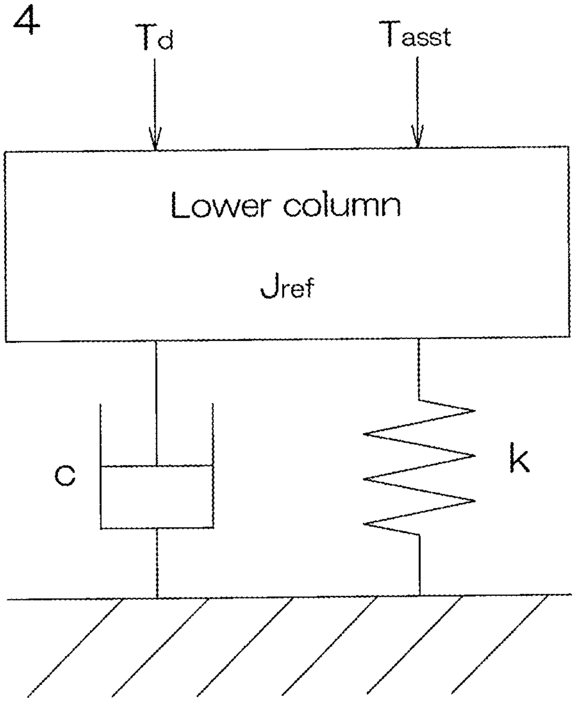
FIG. 4 is a schematic diagram showing an example of a reference EPS model that is used in a manual steering command value generation unit.

FIG. 4 is a schematic diagram showing an example of the reference EPS model that is used in the manual steering command value generation unit 44.

The reference EPS model is a single inertia model including a lower column. The lower column corresponds to the output shaft 9 and the worm wheel 21. In FIG. 4, $J_{ref}$ is the inertia of the lower column, and $T_d$ is the steering torque. The steering torque $T_d$, the assist torque command value $T_{asst}$, and the road reaction torque $T_{rl}$ are applied to the lower column. When the rotational angle of the lower column is the manual steering command value $\theta_{MD}$, the virtual road reaction torque (virtual road reaction force) $T_{rl}$ is given by expression (1) below using the virtual load spring stiffness coefficient k, the virtual load viscous damping coefficient c, and the manual steering command value $\theta_{MD}$.

$$T_{rl} = -k \cdot \theta_{MD} - c(d\theta_{MD}/dt) \tag{1}$$

An equation of motion of the reference EPS model is given by expression (2) below.

$$J_{ref} \cdot d^2\theta_{MD}/dt^2 = T_d + T_{asst} - k \cdot \theta_{MD} - c(d\theta_{MD}/dt) \tag{2}$$

The values of the virtual load spring stiffness coefficient k and the virtual load viscous damping coefficient c are set by the road reaction force characteristic setting unit 48. The virtual load spring stiffness coefficient k and the virtual load viscous damping coefficient c that are the coefficients of the equation of motion given by expression (2) are examples of "road reaction force characteristic coefficient" according to the present invention.

The manual steering command value generation unit 44 calculates the manual steering command value $\theta_{MD}$ by solving the differential equation given by expression (2) by substituting the steering torque $T_d$ detected by the torque sensor 12 into $T_d$ and substituting the assist torque command value $T_{asst}$ set by the assist torque command value setting unit 43 into $T_{asst}$.

[2.2] Configuration of Angle Control Unit 46

Figure 5:
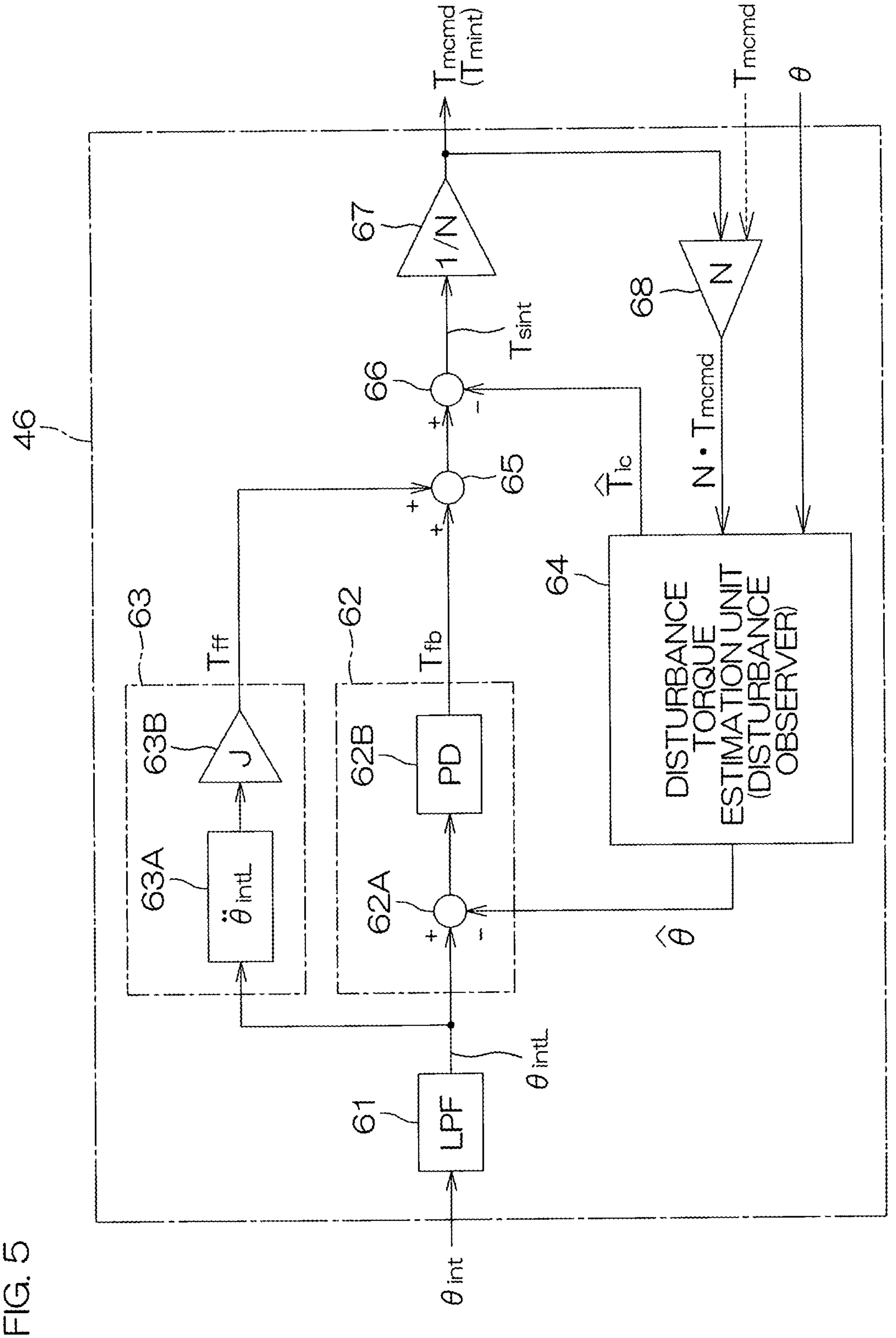
FIG. 5 is a block diagram showing the configuration of an angle control unit.

FIG. 5 is a block diagram showing the configuration of the angle control unit 46.

The angle control unit 46 calculates the motor torque command value $T_{memd}$ based on the integrated angle command value $\theta_{int}$. The angle control unit 46 includes a low-pass filter (LPF) 61, a feedback control unit 62, a feedforward control unit 63, a disturbance torque estimation unit 64, a torque addition unit 65, a disturbance torque compensation unit 66, a reduction ratio division unit 67, and a reduction ratio multiplication unit 68.

The reduction ratio multiplication unit 68 converts the motor torque command value $T_{memd}$ calculated by the reduction ratio division unit 67 into an output shaft torque command value $N \cdot T_{memd}$ that acts on the output shaft 9 (worm wheel 21) by multiplying the motor torque command value $T_{memd}$ by the reduction ratio N of the speed reducer 19.

The low-pass filter 61 performs a low-pass filtering process on the integrated angle command value $\theta_{int}$. An integrated angle command value $\theta_{intL}$ after the low-pass filtering process is provided to the feedback control unit 62 and the feedforward control unit 63.

The feedback control unit 62 is provided to bring an estimated steering angle value $\hat{\theta}$ calculated by the disturbance torque estimation unit 64 closer to the integrated angle command value $\theta_{intL}$ after the low-pass filtering process. The feedback control unit 62 includes an angle deviation calculation unit 62A and a PD control unit 62B. The angle deviation calculation unit 62A calculates a deviation $\Delta\theta(=\theta_{intL}-\hat{\theta})$ between the integrated angle command value $\theta_{intL}$ and the estimated steering angle value $\hat{\theta}$. The angle deviation calculation unit 62A may calculate, as the angle deviation Δθ, a deviation $(\theta_{intL}-\theta)$ between the integrated angle command value $\theta_{intL}$ and the actual steering angle θ calculated by the reduction ratio division unit 42 (see FIG. 2).

The PD control unit 62B calculates feedback control torque $T_{fb}$ by performing PD calculation (proportional-derivative calculation) for the angle deviation Δθ calculated by the angle deviation calculation unit 62A. The feedback control torque $T_{fb}$ is provided to the torque addition unit 65.

The feedforward control unit 63 is provided to improve control response by compensating for a delay in response due to the inertia of the electric power steering system 1. The feedforward control unit 63 includes an angular acceleration calculation unit 63A and an inertia multiplication unit 63B. The angular acceleration calculation unit 63A calculates a target angular acceleration $d^2\theta_{intL}/dt^2$ by obtaining the second derivative of the integrated angle command value $\theta_{intL}$.

The inertia multiplication unit 63B calculates feedforward control torque $T_{ff}$ $(=J \cdot d^2\theta_{intL}/dt^2)$ by multiplying the target angular acceleration $d^2\theta_{intL}/dt^2$ calculated by the angular acceleration calculation unit 63A by inertia J of the electric power steering system 1. The inertia J is obtained from, for example, a physical model of the electric power steering system 1 (see FIG. 6) described later. The feedforward control torque $T_{ff}$ is provided to the torque addition unit 65 as an inertia compensation value.

The torque addition unit 65 calculates a basic torque command value ($T_{fb}+T_{ff}$) by adding the feedforward control torque $T_{ff}$ to the feedback control torque $T_{fb}$.

The disturbance torque estimation unit 64 is provided to estimate non-linear torque (disturbance torque: torque other than the motor torque) that is generated as disturbance in a plant (object to be controlled by the electric motor 18). The disturbance torque estimation unit 64 estimates the disturbance torque (disturbance load) $T_{lc}$, the steering angle θ, and a steering angle differential value (angular velocity) dθ/dt based on the output shaft torque command value $N \cdot T_{mcmd}$ and the actual steering angle θ. The estimated values of the disturbance torque $T_{lc}$, the steering angle θ, and the steering angle differential value (angular velocity) dθ/dt are represented by $\hat{}T_{lc}$, ^θ, and d^θ/dt, respectively. The disturbance torque estimation unit 64 will be described in detail later.

The estimated disturbance torque value $\hat{}T_{lc}$ calculated by the disturbance torque estimation unit 64 is provided to the disturbance torque compensation unit 66 as a disturbance torque compensation value. The estimated steering angle value ^θ calculated by the disturbance torque estimation unit 64 is provided to the angle deviation calculation unit 62A.

The disturbance torque compensation unit 66 calculates an integrated steering torque command value $T_{sint}$ ($=T_{fb}+T_{ff}-\hat{}T_{lc}$) by subtracting the estimated disturbance torque value $\hat{}T_{lc}$ from the basic torque command value ($T_{fb}+T_{ff}$). The integrated steering torque command value $T_{sint}$ (torque command value for the output shaft 9) with the disturbance torque compensated for is thus obtained.

The integrated steering torque command value $T_{sint}$ is provided to the reduction ratio division unit 67. The reduction ratio division unit 67 calculates the motor torque command value $T_{mcmd}$ by dividing the integrated steering torque command value $T_{sint}$ by the reduction ratio N. The motor torque command value $T_{mcmd}$ is provided to the reduction ratio multiplication unit 68 and to the torque control unit 47 (see FIG. 2).

The disturbance torque estimation unit 64 will be described in detail. The disturbance torque estimation unit 64 is a disturbance observer that estimates the disturbance torque $T_{lc}$, the steering angle θ, and the angular velocity dθ/dt using, for example, a physical model 101 of the electric power steering system 1 shown in FIG. 6.

The physical model 101 includes a plant (example of an object to be driven by the motor) 102 that includes the output shaft 9 and the worm wheel 21 fixed to the output shaft 9. The steering torque $T_d$ is applied from the steering wheel 2 to the plant 102 via the torsion bar 10, and the road reaction torque Ti is applied from the steered wheel 3 side to the plant 102.

Moreover, the output shaft torque command value $N \cdot T_{mcmd}$ is applied to the plant 102 via the worm gear 20, and the friction torque $T_f$ is applied to the plant 102 due to the friction between the worm wheel 21 and the worm gear 20.

An equation of motion for the inertia of the physical model 101 is given by expression (3) below, where J is the inertia of the plant 102.

[Math. 1]

$$J\ddot{\theta} = N \cdot T_{mcmd} + T_{lc} \qquad (3)$$
$$T_{lc} = T_d + T_{rl} + T_f$$

$d^2\theta/dt^2$ is the angular acceleration of the plant 102. N is the reduction ratio of the speed reducer 19. $T_{lc}$ represents the disturbance torque other than the motor torque that is applied to the plant 102. While the disturbance torque $T_{lc}$ is shown as the sum of the steering torque $T_d$, the road reaction torque Tri, and the friction torque $T_f$ in the present embodiment, the disturbance torque $T_{lc}$ actually includes torque other than these.

Figure 6:
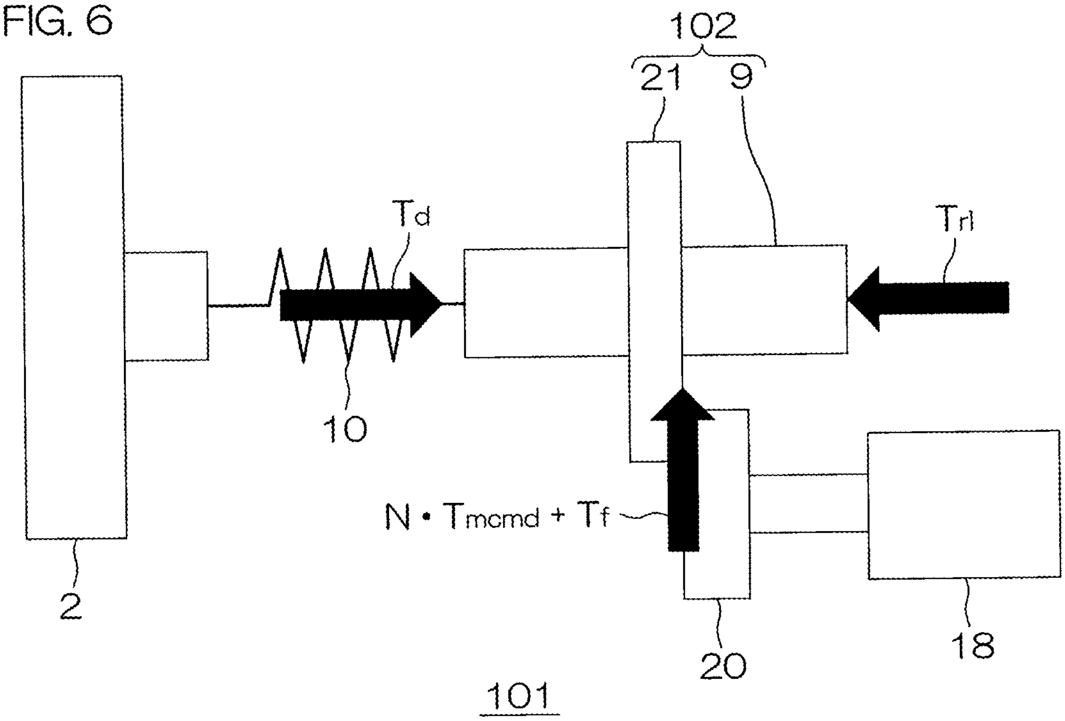
FIG. 6 is a schematic diagram showing an example of the configuration of a physical model of the electric power steering system.

An equation of state for the physical model 101 in FIG. 6 is given by expression (4) below.

[Math. 2]

$$\begin{cases} \dot{x} = Ax + B_1u_1 + B_2u_2 \\ y = Cx + Du_1 \end{cases} \qquad (4)$$

In expression (4) above, x is a state variable vector, $u_1$ is a known input vector, $u_2$ is an unknown input vector, and y is an output vector (measured value). In expression (4) above, A is a system matrix, $B_1$ is a first input matrix, $B_2$ is a second input matrix, C is an output matrix, and D is a direct feedthrough matrix.

The above equation of state is extended to a system including the unknown input vector $u_2$ as one of the states. An equation of state of the extended system (extended equation of state) is given by expression (5) below.

[Math. 3]

$$\begin{cases} \dot{x}_e = A_ex_e + B_eu_1 \\ y = C_ex_e \end{cases} \qquad (5)$$

In expression (5), $x_e$ is a state variable vector of the extended system, and is given by expression (6) below.

[Math. 4]

$$x_e = \begin{bmatrix} x \\ u_2 \end{bmatrix} \qquad (6)$$

In expression (5), $A_e$ is a system matrix of the extended system, $B_e$ is a known input matrix of the extended system, and $C_e$ is an output matrix of the extended system.

A disturbance observer (extended state observer) given by the equation of expression (7) below is constructed from the extended equation of state given by expression (5).

[Math. 5]

$$\begin{cases} \dot{\hat{x}}_e = A_e\hat{x}_e + B_eu_1 + L(y - \hat{y}) \\ \hat{y} = C_e\hat{x}_e \end{cases} \qquad (7)$$

In expression (7), $\hat{x}_e$ represents an estimated value of $x_e$. L is an observer gain. $\hat{y}$ represents an estimated value of y. $\hat{x}_e$ is given by expression (8) below.

[Math. 6]

$$\hat{x}_e = \begin{bmatrix} \hat{\theta} \\ \dot{\hat{\theta}} \\ \hat{T}_{lc} \end{bmatrix} \quad (8)$$

In expression (8), $\hat{\theta}$ is an estimated value of θ, and $\hat{T}_{lc}$ is an estimated value of $T_{lc}$.

The disturbance torque estimation unit 64 calculates the state variable vector $\hat{x}_e$ based on the equation of expression (7).

Figure 7:
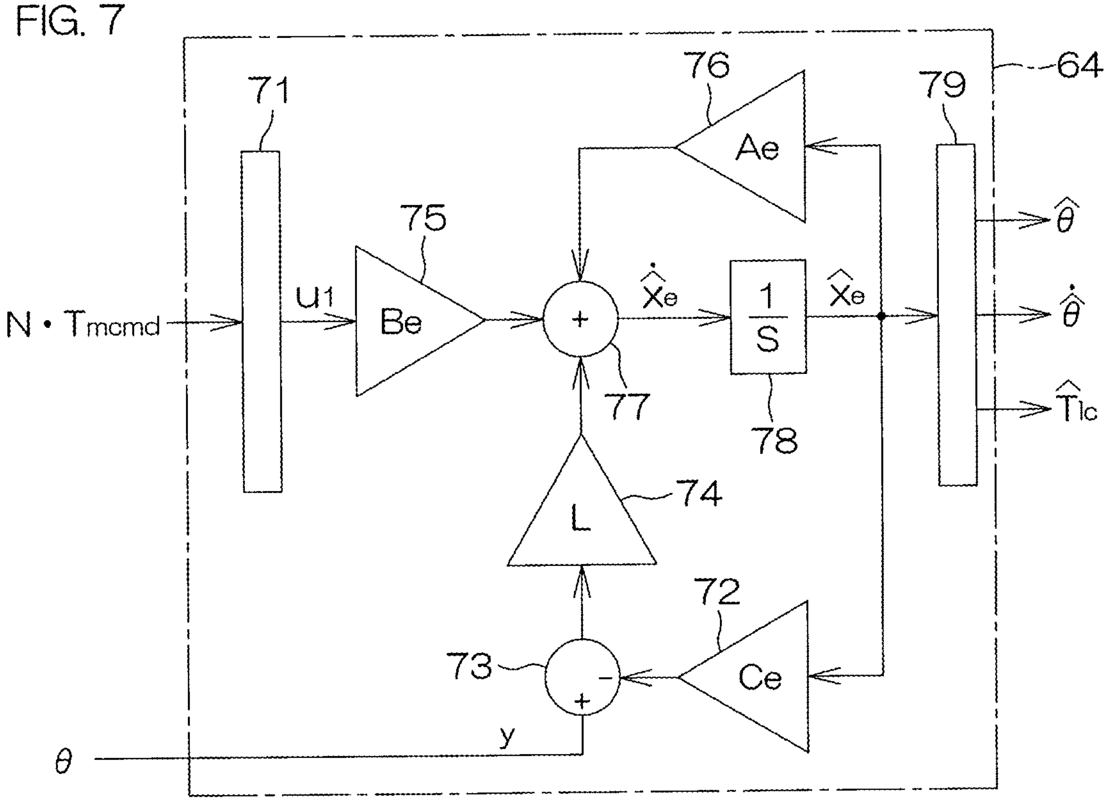
FIG. 7 is a block diagram showing the configuration of a disturbance torque estimation unit.

FIG. 7 is a block diagram showing the configuration of the disturbance torque estimation unit 64.

The disturbance torque estimation unit 64 includes an input vector input unit 71, an output matrix multiplication unit 72, a first addition unit 73, a gain multiplication unit 74, an input matrix multiplication unit 75, a system matrix multiplication unit 76, a second addition unit 77, an integration unit 78, and a state variable vector output unit 79.

The output shaft torque command value $N \cdot T_{mcmd}$ calculated by the reduction ratio multiplication unit 68 (see FIG. 5) is provided to the input vector input unit 71. The input vector input unit 71 outputs the input vector $u_1$.

The output of the integration unit 78 is the state variable vector $\hat{x}_e$ (see expression (8)). At the start of the calculation, an initial value is given as the state variable vector $\hat{x}_e$. The initial value of the state variable vector $\hat{x}_e$ is, for example, 0.

The system matrix multiplication unit 76 multiplies the state variable vector $\hat{x}_e$ by the system matrix $A_e$. The output matrix multiplication unit 72 multiplies the state variable vector $\hat{x}_e$ by the output matrix $C_e$.

The first addition unit 73 subtracts the output ($C_e \cdot \hat{x}_e$) of the output matrix multiplication unit 72 from the output vector (measured value) y that is the actual steering angle θ calculated by the reduction ratio division unit 42 (see FIG. 2). That is, the first addition unit 73 calculates the difference ($y-\hat{y}$) between the output vector y and the estimated output vector value $\hat{y}$ ($=C_e \cdot \hat{x}_e$). The gain multiplication unit 74 multiplies the output ($y-\hat{y}$) of the first addition unit 73 by the observer gain L (see expression (7)).

The input matrix multiplication unit 75 multiplies the input vector $u_1$ output from the input vector input unit 71 by the input matrix $B_e$. The second addition unit 77 calculates a differential value $d\hat{x}_e/dt$ of the state variable vector by adding the output ($B_e \cdot u_1$) of the input matrix multiplication unit 75, the output ($A_e \cdot \hat{x}_e$) of the system matrix multiplication unit 76, and the output ($L(y-\hat{y})$) of the gain multiplication unit 74. The integration unit 78 calculates the state variable vector $\hat{x}_e$ by integrating the output ($d\hat{x}_e/dt$) of the second addition unit 77. The state variable vector output unit 79 calculates the estimated disturbance torque value $\hat{T}_{lc}$, the estimated steering angle value $\hat{\theta}$, and the estimated angular velocity value $d\hat{\theta}/dt$ based on the state variable vector $\hat{x}_e$.

Unlike the extended state observer described above, a typical disturbance observer is composed of an inverse model of the plant and a low-pass filter. An equation of motion of the plant is given by expression (3) as described above. The inverse model of the plant is therefore given by expression (9) below.

[Math. 7]

$$T_{lc} = J\ddot{\theta} - N \cdot T_{mcmd} \quad (9)$$

The inputs to the typical disturbance observer are $J \cdot d^2\theta/dt^2$ and $N \cdot T_{mcmd}$. Since the second derivative of the actual steering angle θ is used, noise of the rotational angle sensor 23 has a great influence. The extended state observer according to the embodiment described above estimates the disturbance torque using an integral type. Therefore, the influence of noise due to differentiation can be reduced.

The typical disturbance observer composed of the inverse model of the plant and the low-pass filter may be used as the disturbance torque estimation unit 64.

[2.3] Configuration of Torque Control Unit 47

Figure 8:
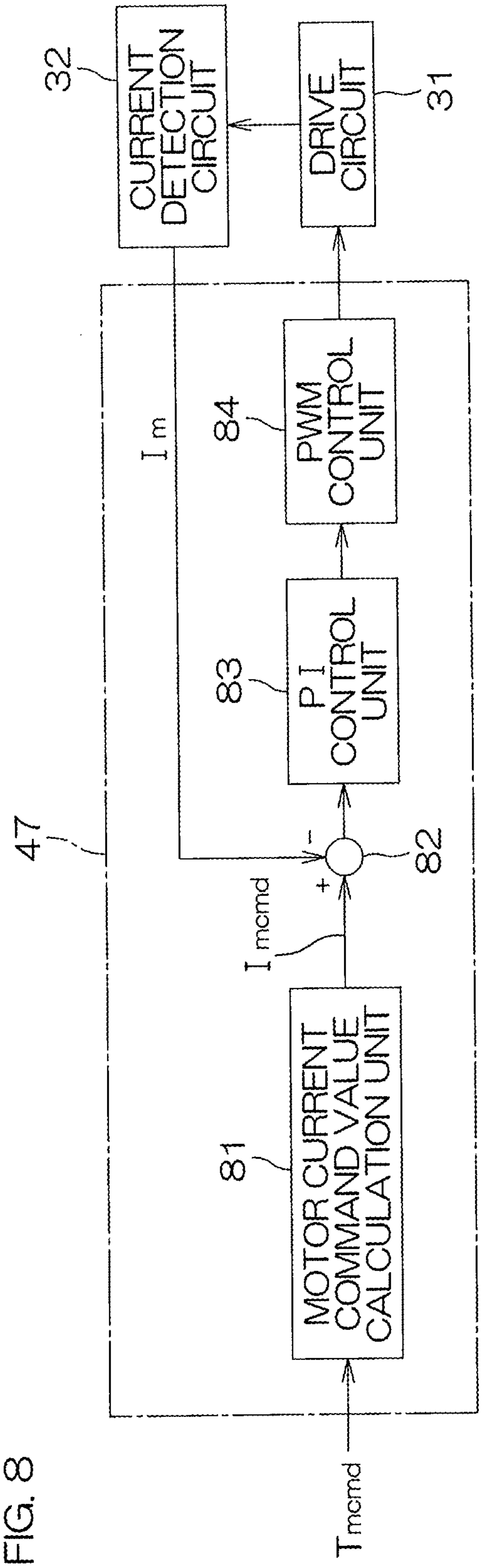
FIG. 8 is a schematic diagram showing the configuration of a torque control unit.

FIG. 8 is a schematic diagram showing the configuration of the torque control unit 47.

The torque control unit 47 (see FIG. 2) includes a motor current command value calculation unit 81, a current deviation calculation unit 82, a PI control unit 83, and a PWM (Pulse Width Modulation) control unit 84.

The motor current command value calculation unit 81 calculates a motor current command value $I_{mcmd}$ by dividing the motor torque command value $T_{mcmd}$ calculated by the angle control unit 46 (see FIG. 2) by a torque constant $K_t$ of the electric motor 18.

The current deviation calculation unit 82 calculates a deviation $\Delta I_m$ ($=I_{mcmd}-I_m$) between the motor current command value $I_{mcmd}$ obtained by the motor current command value calculation unit 81 and the motor current $I_m$ detected by the current detection circuit 32.

The PI control unit 83 generates a drive command value for controlling the motor current $I_m$ flowing through the electric motor 18 to the motor current command value $I_{mcmd}$ by performing PI calculation (proportional-integral calculation) for the current deviation $\Delta I_m$ calculated by the current deviation calculation unit 82. The PWM control unit 84 generates a PWM control signal with a duty ratio corresponding to the drive command value, and supplies the PWM control signal to the drive circuit 31. Electric power corresponding to the drive command value is thus supplied to the electric motor 18.

[3] Command Value Selection Process Performed by Higher-Level ECU 201

Figure 9:
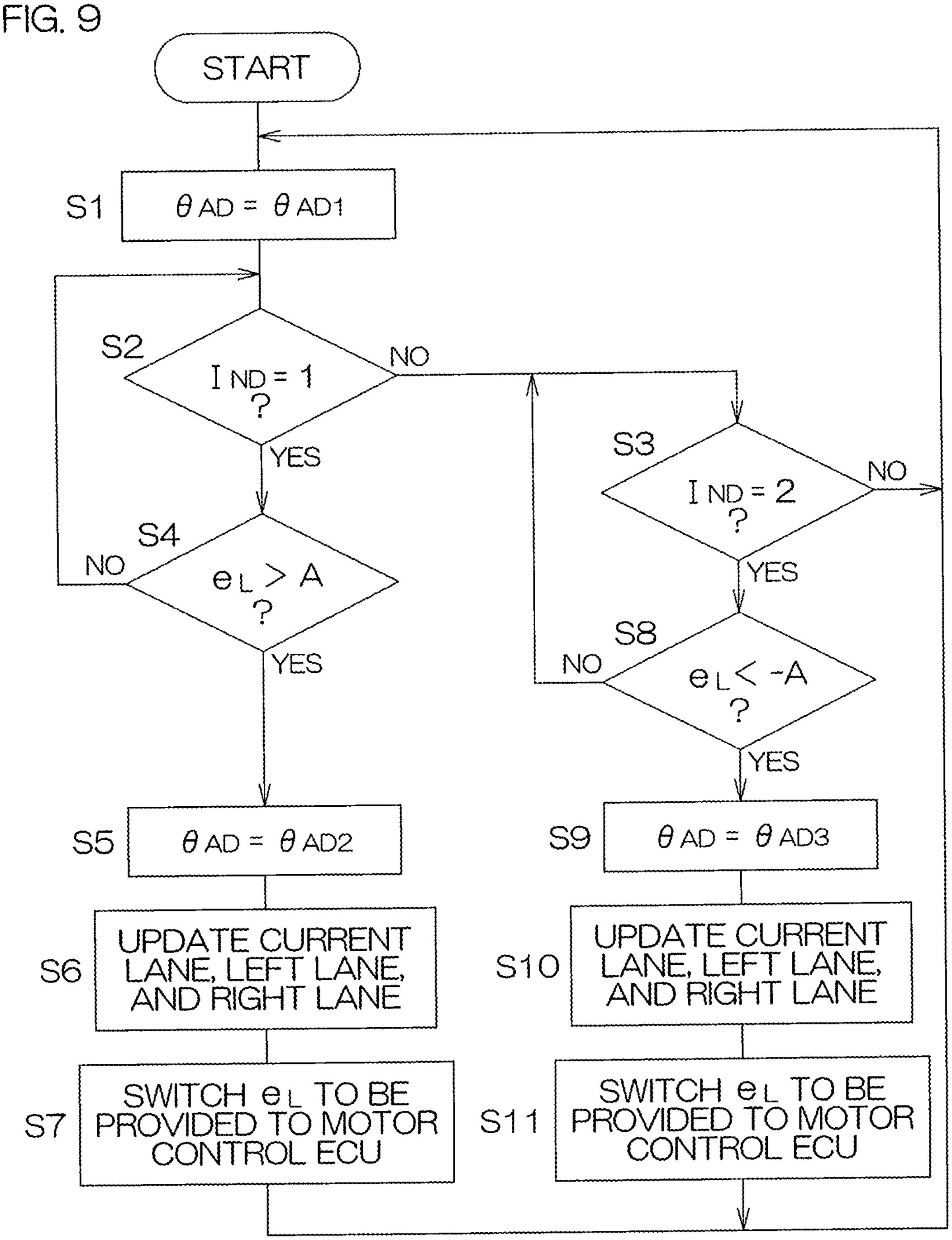
FIG. 9 is a flowchart showing the procedure of a command value selection process that is performed by a higher-level ECU.

FIG. 9 is a flowchart showing the procedure of the command value selection process that is performed by the higher-level ECU 201.

First, the higher-level ECU 201 sets the first automatic steering command value $\theta_{AD1}$ for causing the vehicle to travel along the center line of the current lane as the automatic steering command value $\theta_{AD}$ (step S1).

Next, the higher-level ECU 201 determines whether a direction change command $I_{ND}$ is 1 (step S2). When the direction change command $I_{ND}$ is not 1 (step S2: NO), the higher-level ECU 201 determines whether the direction change command $I_{ND}$ is 2 (step S3). When the direction change command $I_{ND}$ is not 2 (step S3: NO), the higher-level ECU 201 returns to step S1.

When determination is made in step S2 that the direction change command $I_{ND}$ is 1 (step S2: YES), that is, when a rightward direction change command is input, the higher-level ECU 201 determines whether a first lane change approval condition is satisfied (step S4). Specifically, when a predetermined value A larger than 0 is a first threshold value, the higher-level ECU 201 determines whether a first lane change approval condition of $e_L>A$ is satisfied. The first threshold value A is set to, for example, 2.5 m. When the rightward direction change command is input, a direction indicator corresponding to the rightward direction is blinked though illustration is omitted.

When the first lane change approval condition is not satisfied (step S4: NO), the higher-level ECU 201 returns to step S2.

When determination is made in step S4 that the first lane change approval condition is satisfied (step S4: YES), the higher-level ECU 201 selects, as the automatic steering command value $\theta_{AD}$, the second automatic steering command value $\theta_{AD2}$ for causing the vehicle to travel along the center line of a lane adjacent to the current lane on the right side (right lane) (step S5). The automatic steering command value $\theta_{AD}$ is thus switched.

Then, the higher-level ECU 201 sets the right lane as a current lane, sets a lane leftward of the newly set current lane as a left lane, and sets a lane rightward of the newly set current lane as a right lane (step S6). That is, the current lane, the left lane, and the right lane are updated.

The higher-level ECU 201 switches the lateral deviation $e_L$ to be provided to the motor control ECU 202 to a lateral deviation $e_L$ from the center line of the updated current lane (step S7). Then, the higher-level ECU 201 returns to step S1.

When determination is made in step S3 that the direction change command $I_{ND}$ is 2 (step S3: YES), that is, when a leftward direction change command is input, the higher-level ECU 201 determines whether a second lane change approval condition is satisfied (step S8). Specifically, the higher-level ECU 201 determines whether a second lane change approval condition of $e_L<-A$ is satisfied. When the leftward direction change command is input, a direction indicator corresponding to the leftward direction is blinked though illustration is omitted.

When the second lane change approval condition is not satisfied (step S8: NO), the higher-level ECU 201 returns to step S3.

When determination is made in step S8 that the second lane change approval condition is satisfied (step S8: YES), the higher-level ECU 201 selects, as the automatic steering command value $\theta_{AD}$, the third automatic steering command value $\theta_{AD3}$ for causing the vehicle to travel along the center line of a lane adjacent to the current lane on the left side (left lane) (step S9). The automatic steering command value $\theta_{AD}$ is thus switched.

Then, the higher-level ECU 201 sets the left lane as a current lane, sets a lane leftward of the newly set current lane as a left lane, and sets a lane rightward of the newly set current lane as a right lane (step S10). That is, the current lane, the left lane, and the right lane are updated.

The higher-level ECU 201 switches the lateral deviation $e_L$ to be provided to the motor control ECU to a lateral deviation $e_L$ from the center line of the updated current lane (step S11). Then, the higher-level ECU 201 returns to step S1.

[4] Coefficient Switching Process Performed by Road Reaction Force Characteristic Setting Unit 48

The road reaction force characteristic setting unit 48 performs a coefficient switching process for switching the virtual load spring stiffness coefficient k to be used in the manual steering command value generation unit 44 between a virtual load spring stiffness coefficient $k_{LCA}$ for LCA (hereinafter referred to as "first spring stiffness coefficient $k_{LCA}$") and a virtual load spring stiffness coefficient $k_{Lchange}$ for lane change (hereinafter referred to as "second spring stiffness coefficient $k_{Lchange}$").

The second spring stiffness coefficient $k_{Lchange}$ is set to a value larger than the first spring stiffness coefficient $k_{LCA}$. In the present embodiment, the first spring stiffness coefficient $k_{LCA}$ and the second spring stiffness coefficient $k_{Lchange}$ are stored in the memory.

In the present embodiment, the road reaction force characteristic setting unit 48 sets a predetermined value as the virtual load viscous damping coefficient c. That is, in the present embodiment, the value of the virtual load viscous damping coefficient c is fixed to the predetermined value.

Figure 10:
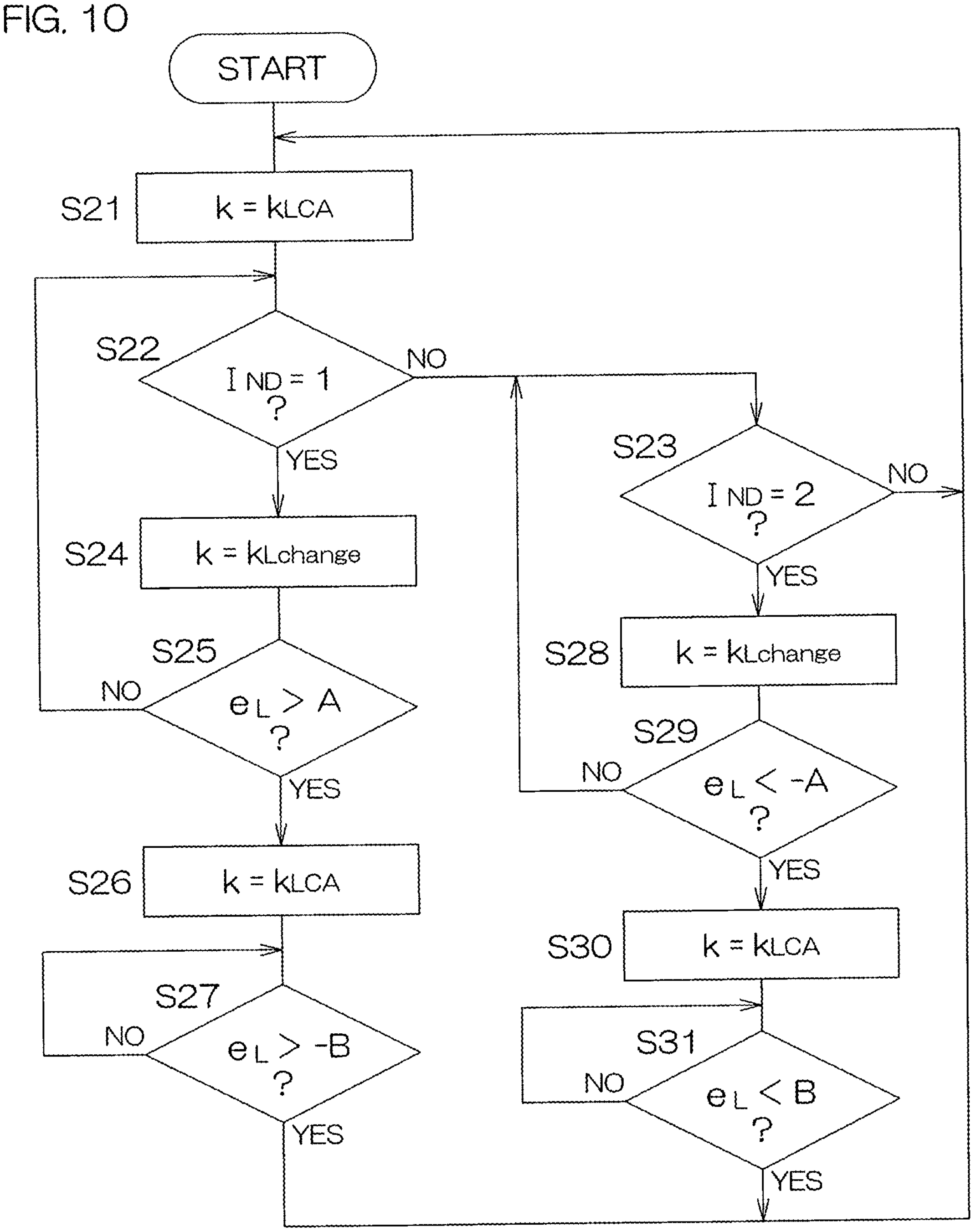
FIG. 10 is a flowchart showing the procedure of a coefficient switching process that is performed by a road reaction force characteristic setting unit.

FIG. 10 is a flowchart showing the procedure of the coefficient switching process that is performed by the road reaction force characteristic setting unit 48.

First, the road reaction force characteristic setting unit 48 sets the first spring stiffness coefficient $k_{LCA}$ as the virtual load spring stiffness coefficient k (step S21).

Next, the road reaction force characteristic setting unit 48 determines whether the direction change command $I_{ND}$ is 1 (step S22). When the direction change command $I_{ND}$ is not 1 (step S22: NO), the road reaction force characteristic setting unit 48 determines whether the direction change command $I_{ND}$ is 2 (step S23). When the direction change command $I_{ND}$ is not 2 (step S23: NO), the road reaction force characteristic setting unit 48 returns to step S21.

When determination is made in step S22 that the direction change command $I_{ND}$ is 1 (step S22: YES), that is, when a rightward direction change command is input, the road reaction force characteristic setting unit 48 sets the second spring stiffness coefficient $k_{Lchange}$ as the virtual load spring stiffness coefficient k (step S24). Thus, the steering reaction force $T_{rl}$ (road reaction torque: see expression (1)) based on the manual steering command value $\theta_{MD}$ is larger than that when the first spring stiffness coefficient $k_{LCA}$ is set as the virtual load spring stiffness coefficient k.

Then, the road reaction force characteristic setting unit 48 determines whether the first lane change approval condition is satisfied (step S25). Specifically, the road reaction force characteristic setting unit 48 determines whether the first lane change approval condition of $e_L>A$ (see step S4 in FIG. 9) is satisfied.

When the first lane change approval condition is not satisfied (step S25: NO), the road reaction force characteristic setting unit 48 returns to step S22.

When determination is made in step S25 that the first lane change approval condition is satisfied (step S25: YES), the road reaction force characteristic setting unit 48 sets the first spring stiffness coefficient $k_{LCA}$ as the virtual load spring stiffness coefficient k (step S26). Thus, the steering reaction force Ti (road reaction torque) based on the manual steering command value $\theta_{MD}$ is smaller than that when the second spring stiffness coefficient $k_{Lchange}$ is set as the virtual load spring stiffness coefficient k.

When determination is made that the first lane change approval condition is satisfied, as described above, the higher-level ECU 201 switches the automatic steering command value $\theta_{AD}$ to the second automatic steering command value $\theta_{AD2}$, and switches the target travel line to the center line of the right lane. Then, the right lane is set as a current lane, a lane leftward of the newly set current lane is set as a left lane, and a lane rightward of the newly set current lane is set as a right lane. The lateral deviation $e_L$ to be provided to the motor control ECU is switched to a lateral deviation $e_L$ from the center line of the updated current lane.

Next, the road reaction force characteristic setting unit 48 determines whether a first determination condition for determining whether the reference vehicle position has reached the vicinity of the center line after the lane change is satisfied (step S27). Specifically, when a predetermined value B larger than 0 is a second threshold value, the road reaction force characteristic setting unit 48 determines whether a first determination condition of $e_L>-B$ is satisfied. The second threshold value B is set to, for example, 1.5 m. The first determination condition may be a condition of $e_L<\theta$ and $|e_L|<B$.

When the first determination condition is not satisfied (step S27: NO), the road reaction force characteristic setting unit 48 returns to step S27. When determination is made in step S27 that the first determination condition is satisfied (step S27: YES), the road reaction force characteristic setting unit 48 returns to step S21.

When determination is made in step S23 that the direction change command $I_{ND}$ is 2 (step S23: YES), that is, when a leftward direction change command is input, the road reaction force characteristic setting unit 48 sets the second spring stiffness coefficient $k_{Lchange}$ as the virtual load spring stiffness coefficient k (step S28). Thus, the steering reaction force $T_{rl}$ (road reaction torque) based on the manual steering command value $\theta_{MD}$ is larger than that when the first spring stiffness coefficient $k_{LCA}$ is set as the virtual load spring stiffness coefficient k.

Then, the road reaction force characteristic setting unit 48 determines whether the second lane change approval condition is satisfied (step S29). Specifically, the road reaction force characteristic setting unit 48 determines whether the second lane change approval condition of $e_L<-A$ (see step S8 in FIG. 9) is satisfied. The second lane change approval condition may be a condition of $e_L<\theta$ and $|e_L|>A$.

When the second lane change approval condition is not satisfied (step S29: NO), the road reaction force characteristic setting unit 48 returns to step S23.

When determination is made in step S29 that the second lane change approval condition is satisfied (step S29: YES), the road reaction force characteristic setting unit 48 sets the first spring stiffness coefficient $k_{LCA}$ as the virtual load spring stiffness coefficient k (step S30). Thus, the steering reaction force $T_{rl}$ (road reaction torque) based on the manual steering command value $\theta_{MD}$ is smaller than that when the second spring stiffness coefficient $k_{Lchange}$ is set as the virtual load spring stiffness coefficient k.

When determination is made that the second lane change approval condition is satisfied, as described above, the higher-level ECU 201 switches the automatic steering command value $\theta_{AD}$ to the third automatic steering command value $\theta_{AD3}$, and switches the target travel line to the center line of the left lane. Then, the left lane is set as a current lane, a lane leftward of the newly set current lane is set as a left lane, and a lane rightward of the newly set current lane is set as a right lane. The lateral deviation $e_L$ to be provided to the motor control ECU is switched to a lateral deviation $e_L$ from the center line of the updated current lane.

Next, the road reaction force characteristic setting unit 48 determines whether a second determination condition for determining whether the reference vehicle position has reached the vicinity of the center line after the lane change is satisfied (step S31). Specifically, the road reaction force characteristic setting unit 48 determines whether a second determination condition of $e_L<B$ is satisfied.

When the second determination condition is not satisfied (step S31: NO), the road reaction force characteristic setting unit 48 returns to step S31. When determination is made in step S31 that the second determination condition is satisfied (step S31: YES), the road reaction force characteristic setting unit 48 returns to step S21.

In FIG. 10, steps S26 and S30 may be omitted. In the case where steps S26 and S30 are omitted, the road reaction force characteristic setting unit 48 proceeds to step S27 when the determination in step S25 is affirmative (YES). The road reaction force characteristic setting unit 48 proceeds to step S31 when the determination in step S29 is affirmative (YES). When the road reaction force characteristic setting unit 48 returns to step S21 from step S27 or S31, the first spring stiffness coefficient $k_{LCA}$ is set as the virtual load spring stiffness coefficient k.

Figure 11:
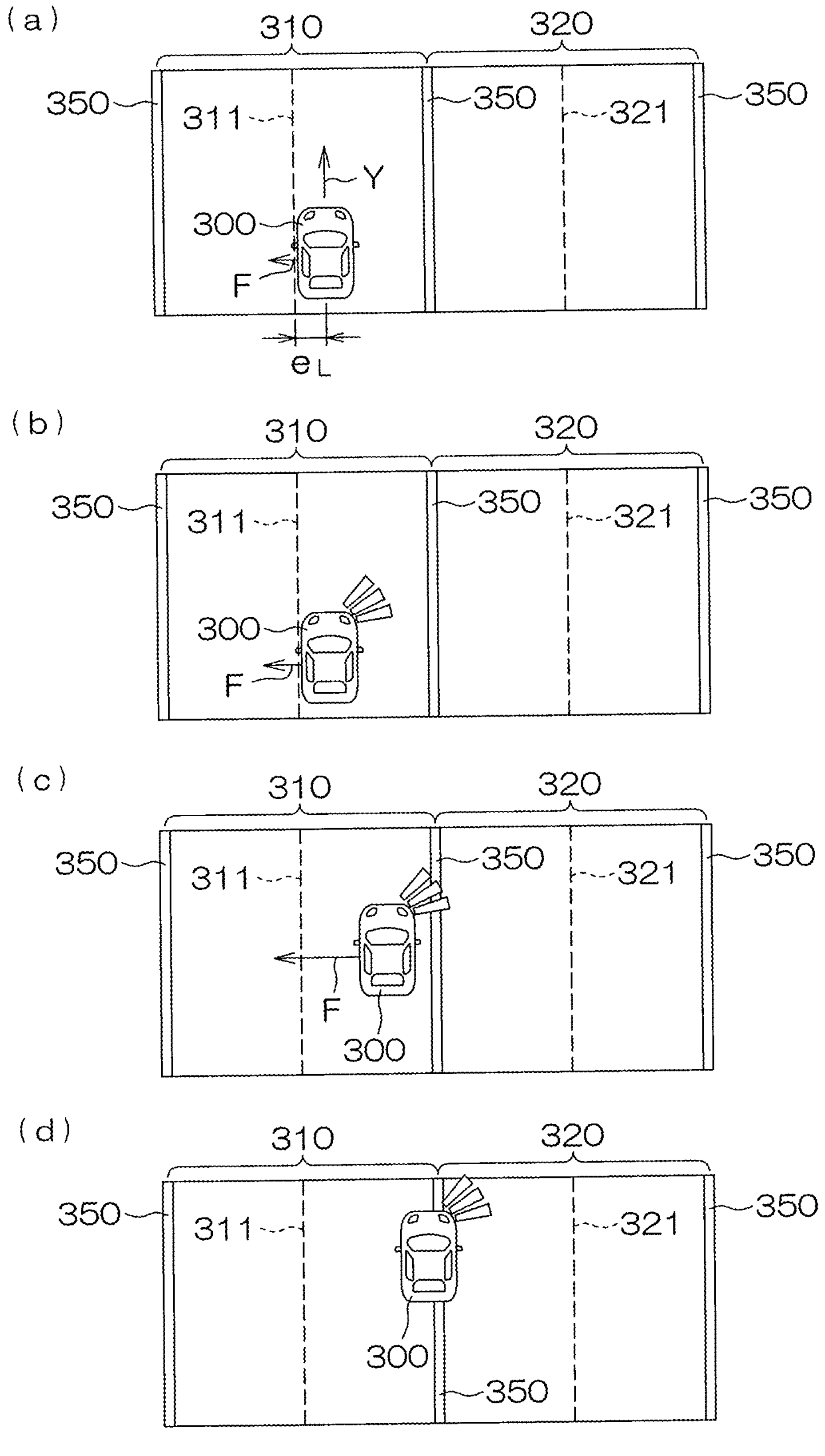
FIGS. 11(*a*), 11(*b*), 11(*c*), and 11(*d*) are schematic diagrams illustrating the movement of a vehicle when a target travel lane in autonomous driving is switched from a current lane to an adjacent lane on the right side.

FIGS. 11(*a*), 11(*b*), 11(*c*), and 11(*d*) are schematic diagrams illustrating the movement of a vehicle when a target travel lane in autonomous driving is switched from a current lane to an adjacent lane on the right side.

Figure 12:
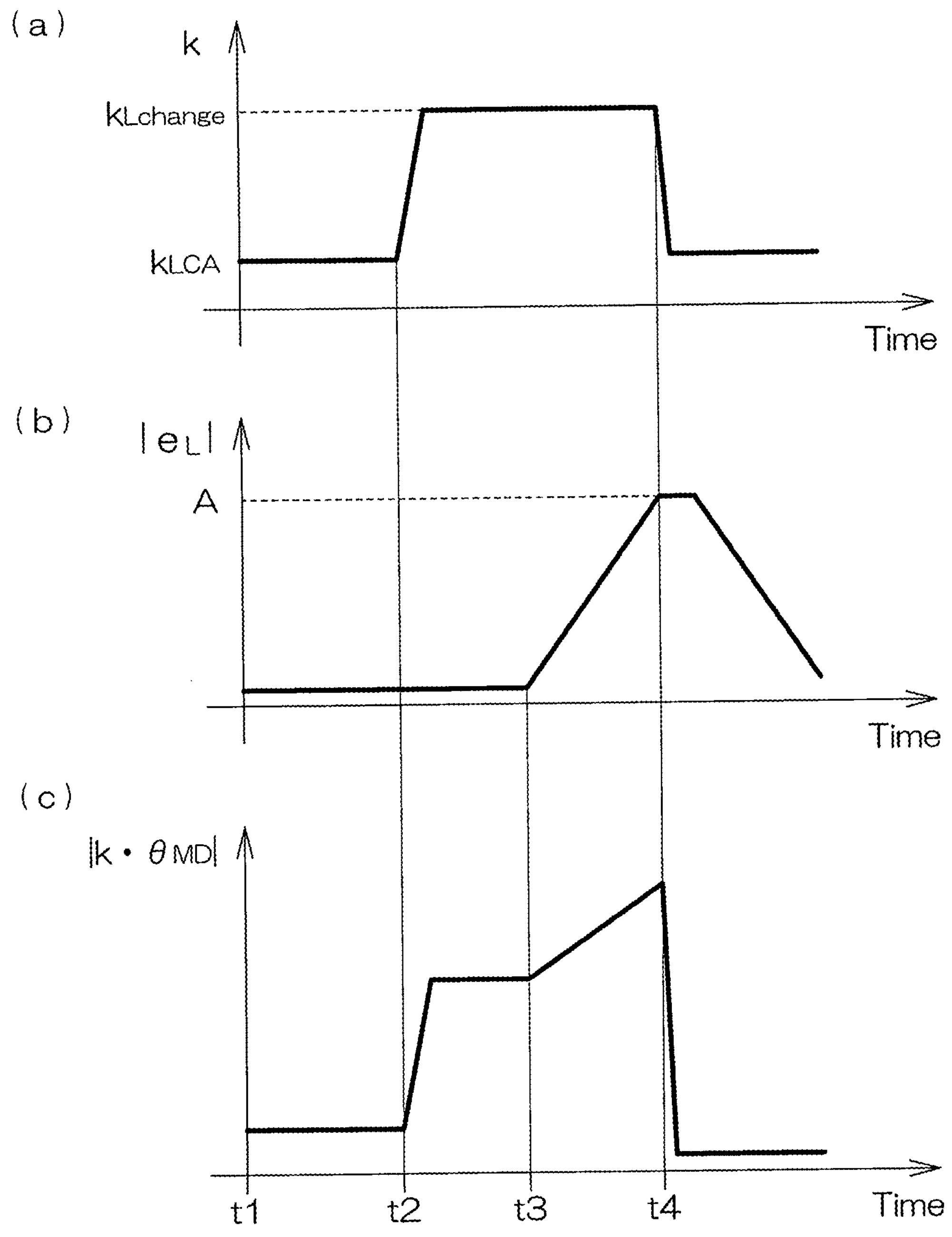
FIGS. 12(*a*), 12(*b*), and 12(*c*) are graphs showing an example of changes in k, $|e_L|$, and $|k\cdot\theta_{MD}|$ when the target travel lane in the autonomous driving is switched from the current lane to the adjacent lane on the right side.

FIGS. 12(*a*), 12(*b*), and 12(*c*) are graphs showing an example of changes in k, $|e_L|$, and $|k\cdot\theta_{MD}|$ when the target travel lane in the autonomous driving is switched from the current lane to the adjacent lane on the right side.

During a period from time t1 to time t2, as shown in FIG. 11(*a*), a vehicle 300 is traveling in a direction of arrow Y on a current lane 310 by driving assistance (autonomous driving). The reference position of the vehicle 300 is rightward of a center line 311 of the current lane 310. Reference sign 320 represents a right lane adjacent to the current lane 310 on the right side, and reference sign 321 represents the center line of the right lane. Reference sign 350 represents a white line (lane marking line).

During the period from time t1 to time t2, as shown in FIG. 12(*a*), the first spring stiffness coefficient $k_{LCA}$ is set as the virtual load spring stiffness coefficient k. As shown in FIG. 12(*b*), the absolute value $|e_L|$ of the lateral deviation $e_L$ is smaller than the threshold value A. In this example, the reference position of the vehicle 300 is rightward of the center line 311 of the current lane 310. Therefore, the lateral deviation $e_L$ is a value larger than 0.

During this period, the driver feels the steering reaction force (road reaction torque) $T_{rl}$ expressed as $\{k\cdot\theta_{MD}-c(d\theta_{MD}/dt)\}$. In this period, however, the absolute value $|k\cdot\theta_{MD}|$ of $k\cdot\theta_{MD}$ is relatively small as shown in FIG. 12(*c*) because the first spring stiffness coefficient $k_{LCA}$ is smaller than the second spring stiffness coefficient $k_{Lchange}$. Therefore, the absolute value $|T_{rl}|$ of the steering reaction force $T_{rl}$ is relatively small as indicated by arrow F in FIG. 11(*a*). In FIGS. 11, the length of arrow F indicates the magnitude of the steering reaction force.

It is assumed that, at time t2, as shown in FIG. 11(*b*), the driver operates a turn signal and inputs a rightward direction change command. The three straight lines extending obliquely forward to the right from the right front corner of the vehicle 300 in FIG. 11(*b*) indicate that a rightward turn signal is blinking.

When the rightward direction change command is input at time t2, as shown in FIG. 12(*a*), the second spring stiffness coefficient $k_{Lchange}$ is set as the virtual load spring stiffness coefficient k (see steps S22, S24 in FIG. 10). Since the second spring stiffness coefficient $k_{Lchange}$ is larger than the first spring stiffness coefficient $k_{LCA}$, the absolute value $|k\cdot\theta_{MD}|$ of $k\cdot\theta_{MD}$ increases as shown in FIG. 12(*c*). Therefore, the absolute value $|T_{rl}|$ of the steering reaction force $T_{rl}$ increases as indicated by arrow F in FIG. 11(*b*).

When the vehicle moves toward the right lane as shown in FIG. 11(*c*) from time t3 after time t2, the absolute value $|e_L|$ of the lateral deviation $e_L$ increases as shown in FIG. 12(*b*). Therefore, the absolute value $|\theta_{MD}|$ of $\theta_{MD}$ increases. Thus, the absolute value $|k\cdot\theta_{MD}|$ of $k\cdot\theta_{MD}$ further increases as shown in FIG. 12(c). Therefore, the absolute value $|T_{rl}|$ of the steering reaction force $T_{rl}$ increases as indicated by arrow F in FIG. 11(c).

It is assumed that, at time t4, the vehicle 300 moves to a position as shown in FIG. 11(*d*) to satisfy the condition for approving the lane change (in this case, the first lane change approval condition: $e_L$>A). Then, as shown in FIG. 12(*a*), the first spring stiffness coefficient $k_{LCA}$ is set as the virtual load spring stiffness coefficient k (see steps S25, S26 in FIG. 10). Thus, the absolute value $|k \cdot \theta_{MD}|$ of $k \cdot \theta_{MD}$ decreases. Further, the lateral deviation $e_L$ is switched to a lateral deviation $e_L$ from the lane after the lane change. Therefore, the absolute value $|e_L|$ of the lateral deviation $e_L$ decreases as shown in FIG. 12(*b*).

When the condition for approving the lane change is satisfied at time t4, the automatic steering command value $\theta_{AD}$ is switched to the automatic steering command value $\theta_{AD2}$ for causing the vehicle to travel along the center line 321 of the adjacent lane (in this case, the right lane 320) according to the direction change command (see step S5 in FIG. 9).

Then, the directions (signs) of the manual steering command value $\theta_{MD}$ and the automatic steering command value $\theta_{AD}$ after the switching coincide with each other. Therefore, the absolute value $|k \cdot \theta_{MD}|$ of k $\theta_{MD}$ decreases immediately after time t4 as shown in FIG. 12(*c*). Thus, the absolute value $|T_{rl}|$ of the steering reaction force $T_{rl}$ decreases. As a result, a large difference occurs between the absolute value $|T_{rl}|$ of the steering reaction force Tri that has increased during the period from time t3 to time t4 and the absolute value $|T_{rl}|$ of the steering reaction force $T_{rl}$ immediately after time t4. Accordingly, the driver easily recognizes that the target travel lane in the autonomous driving (driving assistance) has been switched. That is, in the first embodiment, the driver easily notices that the target travel lane in the autonomous driving has been switched.

As a secondary effect, the absolute value $|k \cdot \theta_{MD}|$ of k $\theta_{MD}$ increases as shown in FIG. 12(*c*) when the vehicle moves toward the right lane from time t3 as shown in FIG. 11(*c*). Therefore, the absolute value $|T_{rl}|$ of the steering reaction force $T_{rl}$ increases as indicated by arrow F in FIG. 11(*c*). In the present embodiment, when the direction change command is input, the virtual load spring stiffness coefficient k is set to a large value. Therefore, the driver needs to apply a larger steering torque to the steering wheel than before to satisfy the lane change approval condition. By increasing the degree to which the driver is actively involved in the lane change in this way, an accidental lane change unintended by the driver can be prevented, and the safety and the sense of security can further be ensured.

[5] Description of Modification of Command Value Selection Process by Higher-level ECU 201

In the above embodiment, the first and second lane change approval conditions in the command value selection process by the higher-level ECU 201 are set based on the lateral deviation $e_L$. In the present modification, the first and second lane change approval conditions are set based on the difference $(\theta-\theta_{AD})$ between the actual steering angle θ and the automatic steering command value $\theta_{AD}$.

Figure 13:
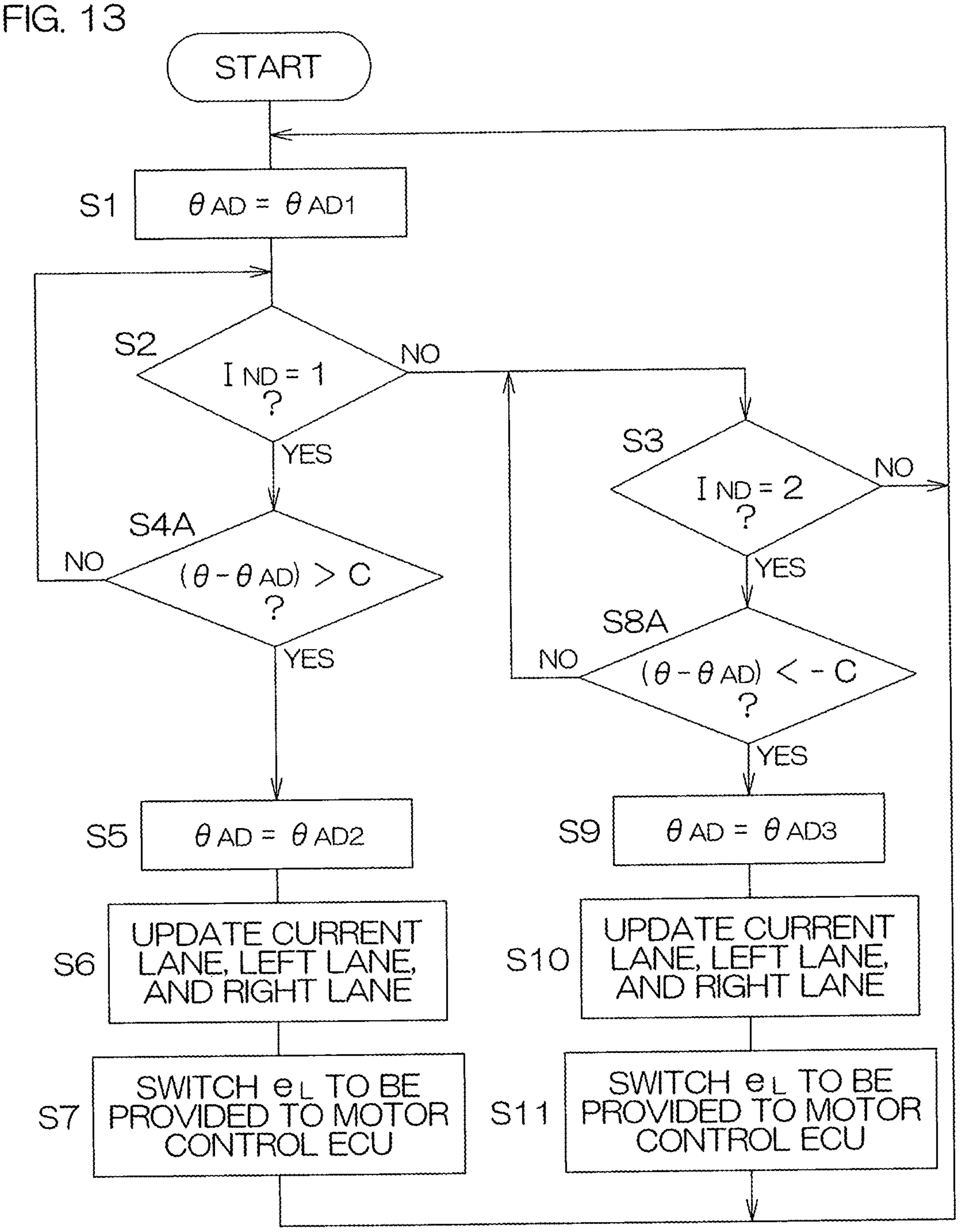
FIG. 13 is a flowchart showing the procedure of a modification of the command value selection process that is performed by the higher-level ECU.

FIG. 13 is a flowchart showing the procedure of the modification of the command value selection process that is performed by the higher-level ECU 201. In FIG. 13, steps corresponding to the steps in FIG. 9 are represented by the same step numbers as those in FIG. 9.

The command value selection process in FIG. 13 differs from the command value selection process in FIG. 9 in terms of steps S4A and S8A that correspond to steps S4 and S8 in FIG. 9.

In step S4A, the higher-level ECU 201 determines whether the first lane change approval condition is satisfied. Specifically, when a predetermined value C larger than 0 is a third threshold value, the higher-level ECU 201 determines whether a first lane change approval condition of $(\theta-\theta_{AD})>C$ is satisfied. The third threshold value C is set to, for example, 100 deg.

In step S8A, the higher-level ECU 201 determines whether the second lane change approval condition is satisfied. Specifically, the higher-level ECU 201 determines whether a second lane change approval condition of $(\theta-\theta_{AD})<-C$ is satisfied.

[6] Description of Modification of Coefficient Switching Process by Road Reaction Force Characteristic Setting Unit 48

In the above embodiment, the first and second lane change approval conditions and the first and second determination conditions in the coefficient switching process by the road reaction force characteristic setting unit 48 are set based on the lateral deviation $e_L$. In the present modification, the first and second lane change approval conditions and the first and second determination conditions are set based on the difference $(\theta-\theta_{AD})$ between the actual steering angle θ and the automatic steering command value $\theta_{AD}$.

In the present modification, as shown by dashed lines in FIG. 2, the road reaction force characteristic setting unit 48 is provided with the automatic steering command value $\theta_{AD}$ from the higher-level ECU 201 and the actual steering angle θ calculated by the reduction ratio division unit 42. In the present modification, the lateral deviation $e_L$ need not be input to the road reaction force characteristic setting unit 48.

Figure 14:
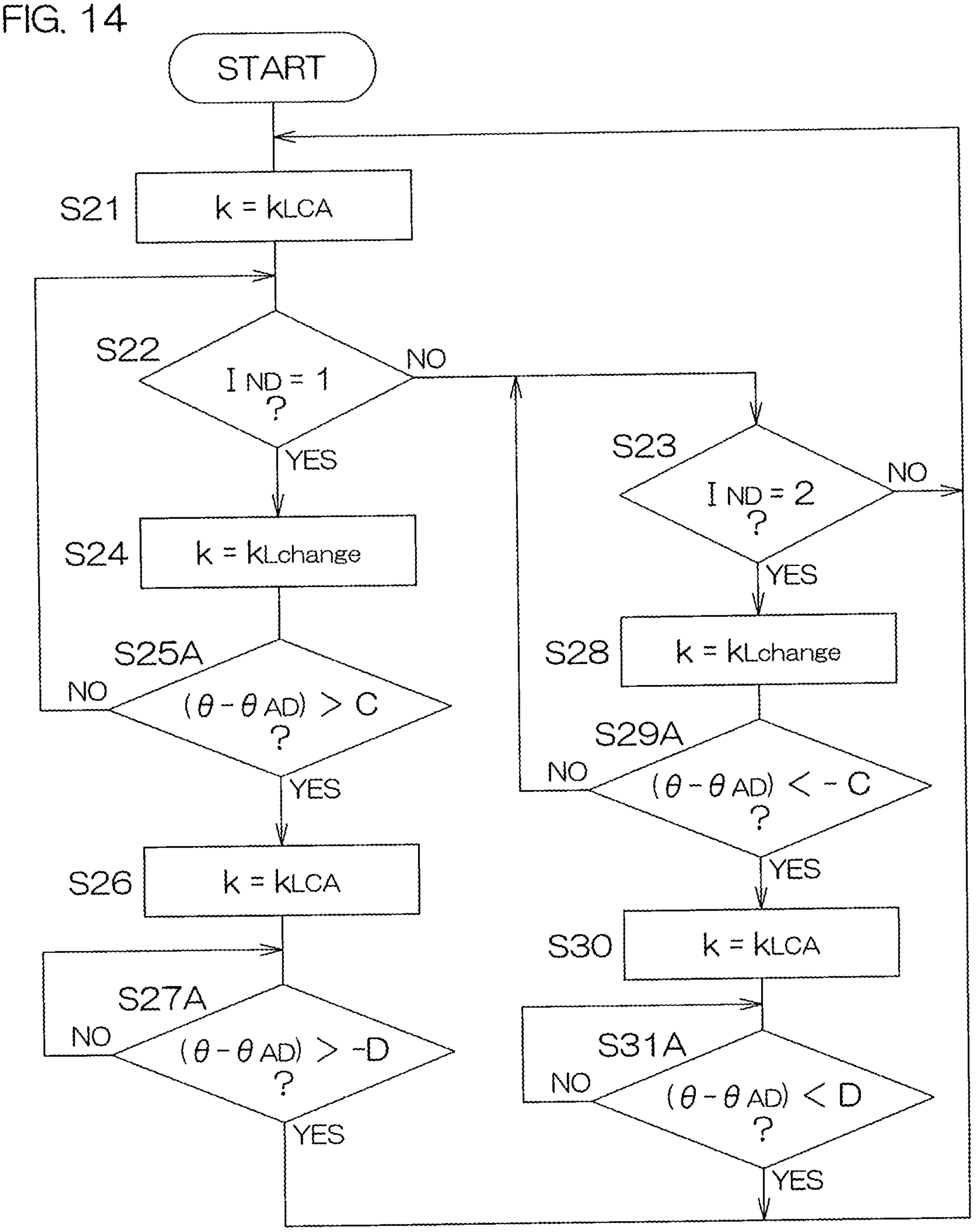
FIG. 14 is a flowchart showing the procedure of a modification of the coefficient switching process that is performed by the road reaction force characteristic setting unit.

FIG. 14 is a flowchart showing the procedure of the modification of the coefficient switching process that is performed by the road reaction force characteristic setting unit 48. In FIG. 14, steps corresponding to the steps in FIG. 10 are represented by the same step numbers as those in FIG. 10.

The coefficient switching process in FIG. 14 differs from the coefficient switching process in FIG. 10 in terms of steps S25A, S27A, S29A, and S31A that correspond to steps S25, S27, S29, and S31 in FIG. 10.

In step S25A, the road reaction force characteristic setting unit 48 determines whether the first lane change approval condition is satisfied. Specifically, the road reaction force characteristic setting unit 48 determines whether the first lane change approval condition of $(\theta-\theta_{AD})>C$ (see step S4A in FIG. 13) is satisfied.

In step S27A, the road reaction force characteristic setting unit 48 determines whether the first determination condition for determining whether the reference vehicle position has reached the vicinity of the center line after the lane change is satisfied. Specifically, when a predetermined value D larger than 0 is a fourth threshold value, the road reaction force characteristic setting unit 48 determines whether a first determination condition of $(\theta-\theta_{AD})>-D$ is satisfied. The fourth threshold value D is set to, for example, 100 deg.

In step S29A, the road reaction force characteristic setting unit 48 determines whether the second lane change approval condition is satisfied. Specifically, the road reaction force characteristic setting unit 48 determines whether the second lane change approval condition of $(\theta-\theta_{AD})<-C$ (see step S8A in FIG. 13) is satisfied.

In step S31A, the road reaction force characteristic setting unit 48 determines whether the second determination condition for determining whether the reference vehicle position has reached the vicinity of the center line after the lane change is satisfied. Specifically, the road reaction force characteristic setting unit 48 determines whether a second determination condition of $(\theta-\theta_{AD})<D$ is satisfied.

[7] Description of Other Modifications of Coefficient Switching Process by Road Reaction Force Characteristic Setting Unit 48

In the first embodiment described above, the virtual load spring stiffness coefficient k is switched in the coefficient switching process by the road reaction force characteristic setting unit 48, but the virtual load viscous damping coefficient c may be switched in addition to the virtual load spring stiffness coefficient k.

In this case, a virtual load viscous damping coefficient $c_{LCA}$ for LCA (hereinafter referred to as "first viscous damping coefficient $c_{LCA}$") and a virtual load viscous damping coefficient $c_{Lchange}$ for lane change (hereinafter referred to as "second viscous damping coefficient $c_{Lchange}$") are stored in the memory as the virtual load viscous damping coefficient c. The second viscous damping coefficient $c_{Lchange}$ is set to a value larger than the first viscous damping coefficient $c_{LCA}$.

In this case, among the steps in FIG. 10 (FIG. 14 when this case is applied to FIG. 14), the process of steps S21, S24, S26, S28, and S30 may be changed as follows.

That is, in steps S21, S26, and S30, the road reaction force characteristic setting unit 48 sets the first spring stiffness coefficient $k_{LCA}$ as the virtual load spring stiffness coefficient k, and sets the first viscous damping coefficient $c_{LCA}$ as the virtual load viscous damping coefficient c.

In steps S24 and S28, the road reaction force characteristic setting unit 48 sets the second spring stiffness coefficient $k_{Lchange}$ as the virtual load spring stiffness coefficient k, and sets the second viscous damping coefficient $c_{Lchange}$ as the virtual load viscous damping coefficient c.

In the first embodiment described above, the virtual load spring stiffness coefficient k is switched in the coefficient switching process by the road reaction force characteristic setting unit 48, but the virtual load viscous damping coefficient c may be switched instead of the virtual load spring stiffness coefficient k.

In this case, among the steps in FIG. 10 (FIG. 14 when this case is applied to FIG. 14), the process of S21, S24, S26, S28, and S30 may be changed as follows.

That is, in steps S21, S26, and S30, the road reaction force characteristic setting unit 48 sets the first viscous damping coefficient $c_{LCA}$ as the virtual load viscous damping coefficient c.

In steps S24 and S28, the road reaction force characteristic setting unit 48 sets the second viscous damping coefficient $c_{Lchange}$ as the virtual load viscous damping coefficient c.

[8] Description of Modification of Motor Control ECU

Figure 15:
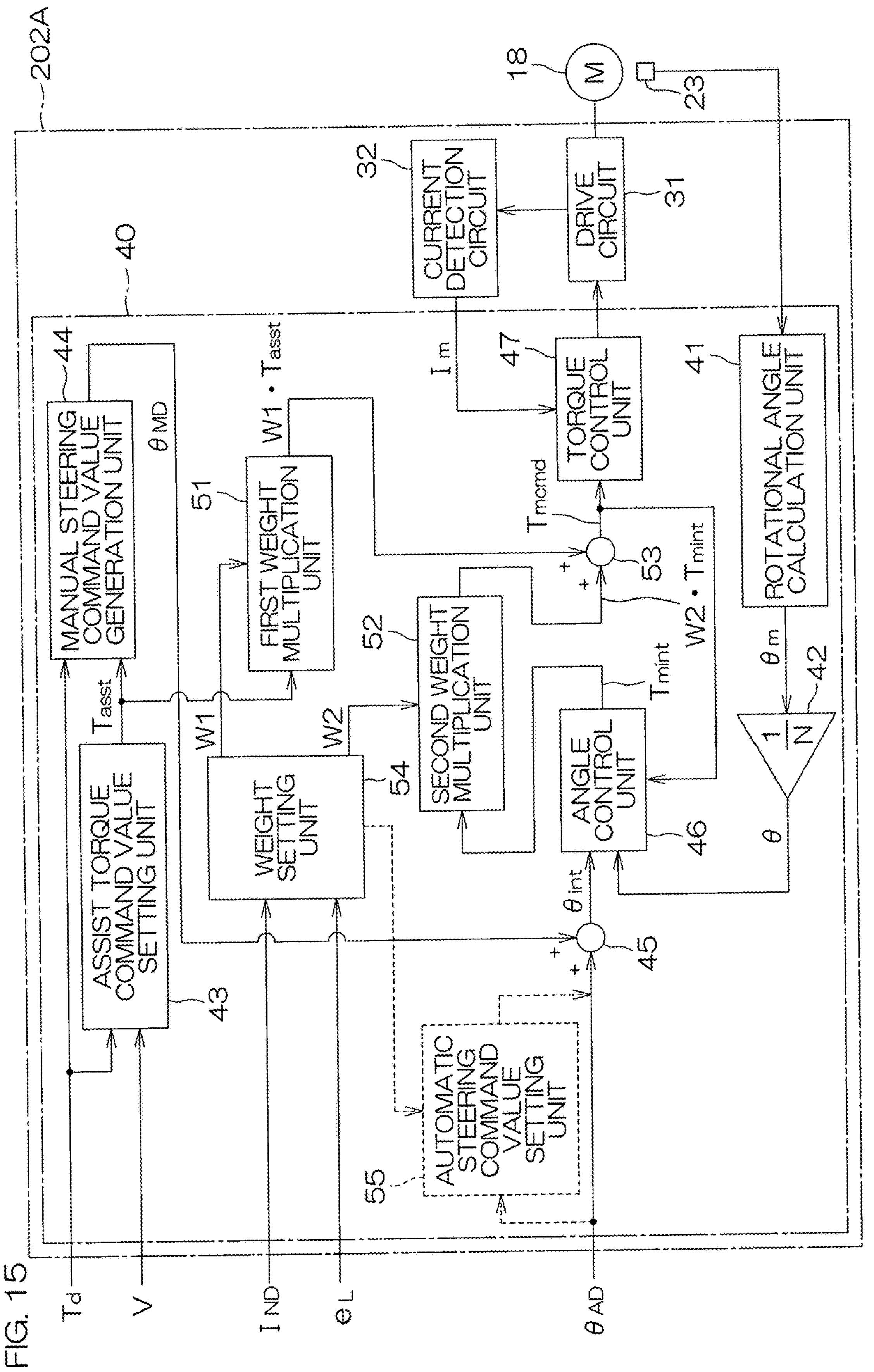
FIG. 15 is a block diagram illustrating an electrical configuration of a modification of the motor control ECU.

FIG. 15 is a block diagram illustrating an electrical configuration of a modification of the motor control ECU. In FIG. 15, portions corresponding to those in FIG. 2 are represented by the same signs as those in FIG. 2.

A motor control ECU 202A includes the microcomputer 40, the drive circuit (inverter circuit) 31 that is controlled by the microcomputer 40 and supplies electric power to the electric motor 18, and the current detection circuit 32 that detects a current (hereinafter referred to as "motor current $I_m$") that flows through the electric motor 18.

The microcomputer 40 includes a CPU and a memory (such as a ROM, a RAM, and a non-volatile memory), and functions as a plurality of functional processing units by executing a predetermined program.

The plurality of functional processing units includes the rotational angle calculation unit 41, the reduction ratio division unit 42, the assist torque command value setting unit 43, the manual steering command value generation unit 44, the integrated angle command value calculation unit 45, the angle control unit 46, a first weight multiplication unit 51, a second weight multiplication unit 52, an addition unit 53, the torque control unit (current control unit) 47, and a weight setting unit 54.

The motor control ECU 202A differs from the motor control ECU 202 in FIG. 2 in that the motor control ECU 202A does not include the road reaction force characteristic setting unit 48 but includes the first weight multiplication unit 51, the second weight multiplication unit 52, the addition unit 53, and the weight setting unit 54.

The operations of the rotational angle calculation unit 41, the reduction ratio division unit 42, the assist torque command value setting unit 43, the manual steering command value generation unit 44, and the integrated angle command value calculation unit 45 are the same as those of the corresponding portions in FIG. 2.

The configuration of the angle control unit 46 in FIG. 15 is substantially the same as the configuration of the angle control unit 46 in FIG. 5, but slightly differs from the configuration in FIG. 5. Specifically, in the angle control unit 46 in FIG. 15, the reduction ratio division unit 67 in FIG. 5 calculates an integrated motor torque command value $T_{mint}$ as shown by $(T_{mint})$ in FIG. 5 by dividing the integrated steering torque command value $T_{sint}$ by the reduction ratio N. The integrated motor torque command value $T_{mint}$ is provided to the second weight multiplication unit 52. In the angle control unit 46 in FIG. 15, as shown by a dashed line in FIG. 5, the reduction ratio multiplication unit 68 in FIG. 5 is provided with the motor torque command value $T_{mcmd}$ calculated by the addition unit 53 in FIG. 15.

The first weight multiplication unit 51 multiplies the assist torque command value $T_{asst}$ set by the assist torque command value setting unit 43 by a first weight W1. The second weight multiplication unit 52 multiplies the integrated motor torque command value $T_{mint}$ by a second weight W2. The first weight W1 and the second weight W2 are set by the weight setting unit 54. The weight setting unit 54 performs a weight setting process for setting the first weight W1 and the second weight W2 based on the direction change command $I_{ND}$ and the lateral deviation $e_L$. The weight setting process will be described in detail later.

The addition unit 53 calculates the motor torque command value $T_{mcmd}$ for the electric motor 18 by adding an assist torque command value $W1 \cdot T_{asst}$ after first weight multiplication (after a first weighting process) and an integrated motor torque command value W2 $T_{mint}$ after second weight multiplication (after a second weighting process).

In the present modification as well, the higher-level ECU 201 performs the command value selection process described with reference to FIG. 9 or 13. In the present modification, the virtual load spring stiffness coefficient k to be used in the manual steering command value generation unit 44 is set to a predetermined value. The predetermined value may be, for example, the virtual load spring stiffness coefficient $k_{LCA}$ for LCA described above. The virtual load viscous damping coefficient c to be used in the manual steering command value generation unit 44 is also set to a predetermined value. The predetermined value may be, for example, the virtual load viscous damping coefficient $c_{LCA}$ for LCA described above.

Figure 16:
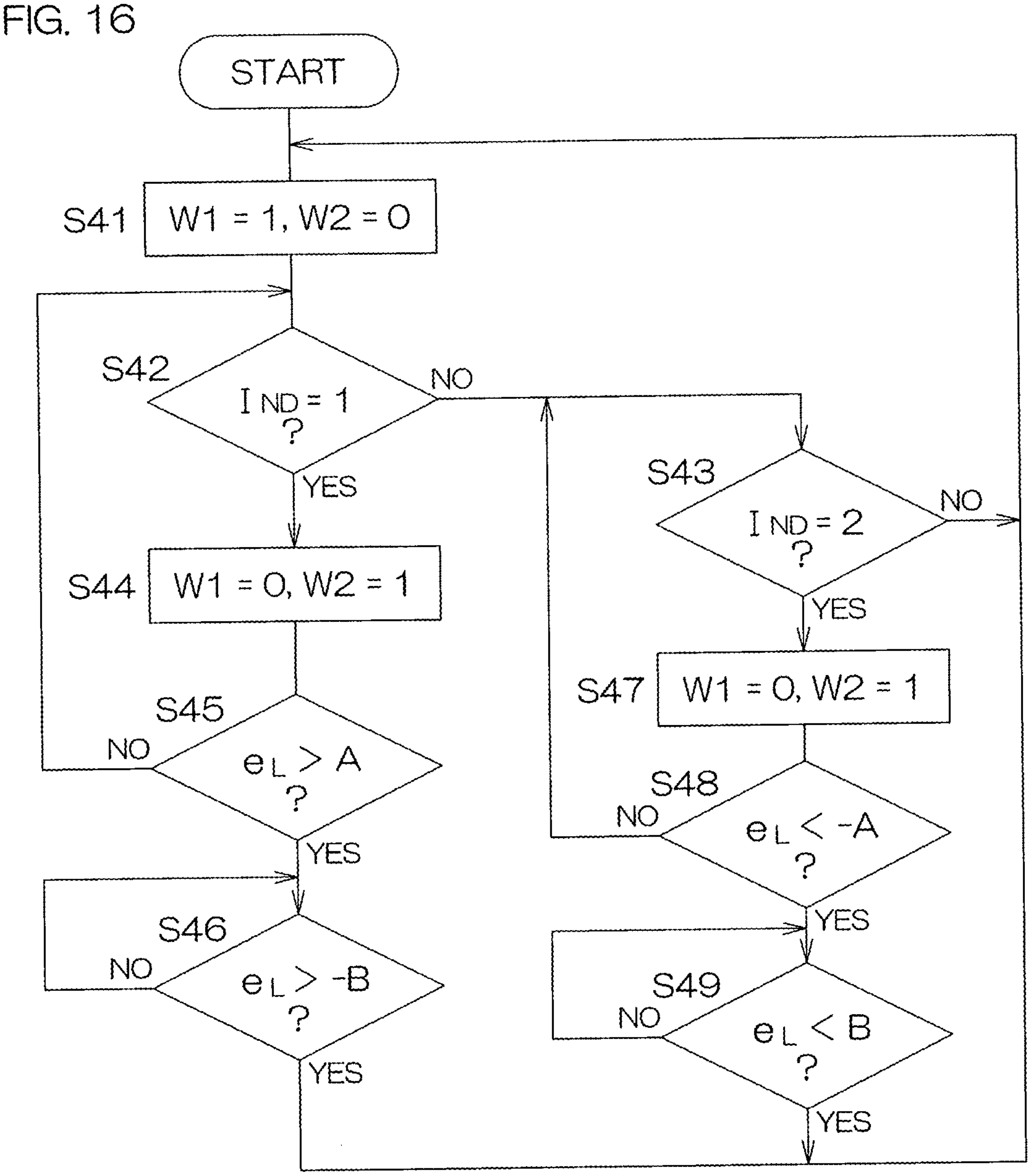
FIG. 16 is a flowchart showing the procedure of a weight setting process that is performed by a weight setting unit.

FIG. 16 is a flowchart showing the procedure of the weight setting process that is performed by the weight setting unit 54.

First, the weight setting unit 54 sets the first weight W1 to 1, and sets the second weight W2 to 0 (step S41). The control mode of the electric motor 18 thus becomes a first control mode in which the drive of the electric motor 18 is controlled only by the assist torque command value $T_{asst}$.

Next, the weight setting unit 54 determines whether the direction change command $I_{ND}$ is 1 (step S42). When the direction change command $I_{ND}$ is not 1 (step S42: NO), the weight setting unit 54 determines whether the direction change command $I_{ND}$ is 2 (step S43). When the direction change command $I_{ND}$ is not 2 (step S43: NO), the weight setting unit 54 returns to step S41.

When determination is made in step S42 that the direction change command $I_{ND}$ is 1 (step S42: YES), that is, when a rightward direction change command is input, the weight setting unit 54 sets the first weight W1 to 0, and sets the second weight W2 to 1 (step S44). At this time, it is preferable that the weight setting unit 54 gradually reduce the first weight W1 from 1 to 0 and gradually increase the second weight W2 from 0 to 1. The time for gradually reducing the first weight W1 from 1 to 0 (time for gradually increasing the second weight W2 from 0 to 1) may be, for example, about 0.1 seconds.

The control mode of the electric motor 18 thus becomes a second control mode in which the drive of the electric motor 18 is controlled by the integrated motor torque command value $T_{mint}$. While the first weight W1 is being gradually reduced (while the second weight W2 is being gradually increased), the electric motor 18 is controlled based on the sum of the assist torque command value W1 $T_{asst}$ after the first weight multiplication and the integrated motor torque command value W2 $T_{mint}$ after the second weight multiplication.

Next, the weight setting unit 54 determines whether the first lane change approval condition is satisfied (step S45). Specifically, the weight setting unit 54 determines whether the first lane change approval condition of $e_L>A$ (see step S25 in FIG. 10) is satisfied.

When the first lane change approval condition is not satisfied (step S45: NO), the weight setting unit 54 returns to step S42.

When determination is made in step S45 that the first lane change approval condition is satisfied (step S45: YES), the weight setting unit 54 determines whether the first determination condition for determining whether the reference vehicle position has reached the vicinity of the center line after the lane change is satisfied (step S46). Specifically, the weight setting unit 54 determines whether the first determination condition of $e_L>-B$ (see step S27 in FIG. 10) is satisfied. The first determination condition may be a condition of $e_L<0$ and $|e_L|<B$.

When determination is made that the first lane change approval condition is satisfied, as described above, the higher-level ECU 201 switches the automatic steering command value $\theta_{AD}$ to the second automatic steering command value $\theta_{AD2}$, and switches the target travel line to the center line of the right lane. Then, the right lane is set as a current lane, a lane leftward of the newly set current lane is set as a left lane, and a lane rightward of the newly set current lane is set as a right lane. The lateral deviation $e_L$ to be provided to the motor control ECU is switched to a lateral deviation $e_L$ from the center line of the updated current lane.

When the first determination condition is not satisfied (step S46: NO), the weight setting unit 54 returns to step S46. When determination is made in step S46 that the first determination condition is satisfied (step S46: YES), the weight setting unit 54 returns to step S41.

When determination is made in step S43 that the direction change command $I_{ND}$ is 2 (step S43: YES), that is, when a leftward direction change command is input, the weight setting unit 54 sets the first weight W1 to 0, and sets the second weight W2 to 1 (step S47). At this time, it is preferable that the weight setting unit 54 gradually reduce the first weight W1 from 1 to 0 and gradually increase the second weight W2 from 0 to 1. The time for gradually reducing the first weight W1 from 1 to 0 (time for gradually increasing the second weight W2 from 0 to 1) may be, for example, about 0.1 seconds. The control mode of the electric motor 18 thus becomes the second control mode in which the drive of the electric motor 18 is controlled by the integrated motor torque command value $T_{mint}$.

Next, the weight setting unit 54 determines whether the second lane change approval condition is satisfied (step S48). Specifically, the weight setting unit 54 determines whether the second lane change approval condition of $e_L<-A$ (see step S29 in FIG. 10) is satisfied.

When the second lane change approval condition is not satisfied (step S48: NO), the weight setting unit 54 returns to step S43.

When determination is made in step S48 that the second lane change approval condition is satisfied (step S48: YES), the weight setting unit 54 determines whether the second determination condition for determining whether the reference vehicle position has reached the vicinity of the center line after the lane change is satisfied (step S49). Specifically, the weight setting unit 54 determines whether the second determination condition of $e_L<B$ (see step S31 in FIG. 10) is satisfied.

When determination is made that the second lane change approval condition is satisfied, as described above, the higher-level ECU 201 switches the automatic steering command value $\theta_{AD}$ to the third automatic steering command value $\theta_{AD3}$, and switches the target travel line to the center line of the left lane. Then, the left lane is set as a current lane, a lane leftward of the newly set current lane is set as a left lane, and a lane rightward of the newly set current lane is set as a right lane. The lateral deviation $e_L$ to be provided to the motor control ECU is switched to a lateral deviation $e_L$ from the center line of the updated current lane.

When the second determination condition is not satisfied (step S49: NO), the weight setting unit 54 returns to step S49. When determination is made in step S49 that the second determination condition is satisfied (step S49: YES), the weight setting unit 54 returns to step S41.

Figure 17:
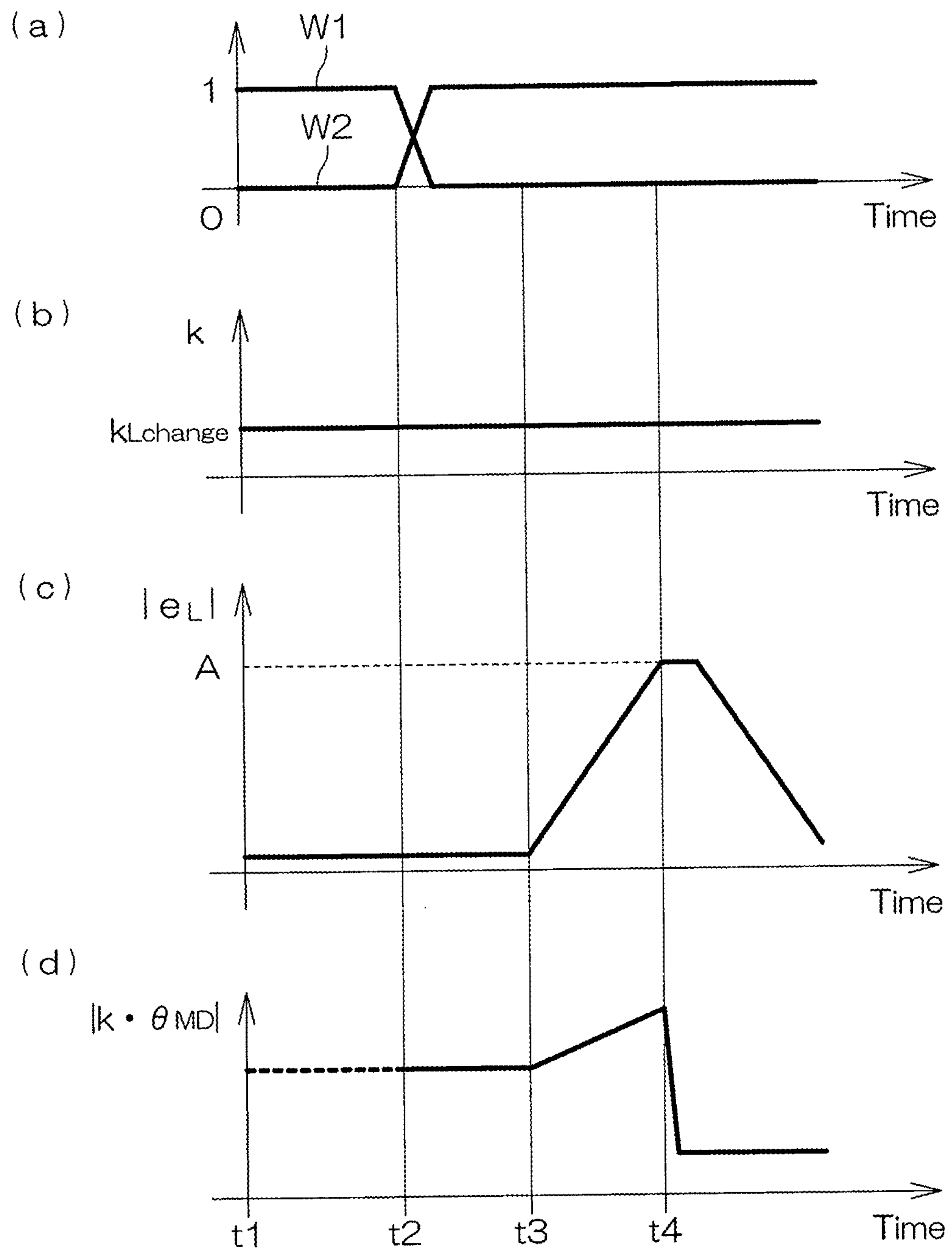
FIGS. 17(*a*), 17(*b*), 17(*c*), and 17(*d*) are graphs showing an example of changes in W1 and W2, k, $|e_L|$, and $|k \cdot \theta_{MD}|$ when the target travel lane in the autonomous driving is switched from the current lane to the adjacent lane on the right side.

FIGS. 17(*a*), 17(*b*), 17(*c*), and 17(*d*) are graphs showing an example of changes in W1, W2, k, $|e_L|$, and $|k \cdot \theta_{MD}|$ when the target travel lane in the autonomous driving (driving assistance) is switched from the current lane to the adjacent lane on the right side (right lane).

It is assumed that, during a period from time t1 to time t2, the vehicle is traveling on a current lane by driving assistance (autonomous driving). It is assumed that the reference position of the vehicle is rightward of the center line in the current lane.

During the period from time t1 to time t2, W1=1 and W2=0 are set as shown in FIG. 17(*a*). As shown in FIG.

17(*b*), the virtual load spring stiffness coefficient k ($=k_{Lchange}$) is always constant. The virtual load spring stiffness coefficient k may be set to a value other than $k_{Lchange}$ described above.

During the period from time t1 to time t2, the control mode of the electric motor 18 becomes the first control mode in which the drive of the electric motor 18 is controlled only by the assist torque command value $T_{asst}$ (see FIG. 15). Thus, the driver feels the actual road reaction force. The manual steering command value generation unit 44 always calculates the manual steering command value $\theta_{MD}$. Since W2=0, the driver does not feel k $\theta_{MD}$ (more specifically, {k $\theta_{MD}$−c($d\theta_{MD}/dt$)}) as the steering reaction force $T_{rl}$ as shown by a dashed line in FIG. 17(*d*).

When the driver operates the turn signal at time t2, W1 gradually decreases from 1 to 0. Further, W2 gradually increases from 0 to 1 (see steps S42, S44 in FIG. 16). The control mode of the electric motor 18 thus becomes the second control mode in which the drive of the electric motor 18 is controlled by the integrated motor torque command value $T_{mint}$ (see FIG. 15). Thus, the driver feels k $\theta_{MD}$ (more specifically, {$k\cdot\theta_{MD}$−c($d\theta_{MD}/dt$)}) as the steering reaction force $T_{rl}$ as shown in FIG. 17(*d*).

When the vehicle moves toward the right lane from time t3 after time t2, the absolute value $|e_L|$ of the lateral deviation $e_L$ increases as shown in FIG. 17(*c*). Therefore, the absolute value $|\theta_{MD}|$ of $\theta_{MD}$ increases. Thus, the absolute value $|k\cdot\theta_{MD}|$ of k $\theta_{MD}$ further increases as shown in FIG. 17(*d*). Thus, the absolute value $|T_{rl}|$ of the steering reaction force Tri based on k $\theta_{MD}$ increases.

When the condition for approving the lane change (in this case, the first lane change approval condition: $e_L$>A) is satisfied at time t4 (see step S45 in FIG. 16), the automatic steering command value $\theta_{AD}$ is switched to the automatic steering command value $\theta_{AD2}$ for causing the vehicle to travel along the center line of the adjacent lane (in this case, the right lane) according to the direction change command (see step S5 in FIG. 9).

Then, the directions (signs) of the manual steering command value $\theta_{MD}$ and the automatic steering command value $\theta_{AD}$ after the switching coincide with each other. Therefore, the absolute value $|k\cdot\theta_{MD}|$ of k $\theta_{MD}$ decreases immediately after time t4 as shown in FIG. 17(*d*). Thus, the absolute value $|T_{rl}|$ of the steering reaction force $T_{rl}$ based on $k\cdot\theta_{MD}$ decreases. As a result, a large difference occurs between the absolute value $|T_{rl}|$ of the steering reaction force $T_{rl}$ that has increased during the period from time t3 to time t4 and the absolute value $|T_{rl}|$ of the steering reaction force $T_{rl}$ immediately after time t4. Accordingly, the driver easily recognizes that the target travel lane in the autonomous driving (driving assistance) has been switched. That is, in the present modification as well, the driver easily notices that the target travel lane in the autonomous driving has been switched.

In steps S44, S47 in FIG. 16, the weight setting unit 54 may set the first weight W1 to 0, set the second weight W2 to 1, and set the automatic steering command value $\theta_{AD}$ to be provided to the integrated angle command value calculation unit 45 to θ or the current actual steering angle θ instead of the automatic steering command value $\theta_{AD}$ from the higher-level ECU 201.

To perform such a process, as shown by dashed lines in FIG. 15, an automatic steering command value setting unit 55 for setting the automatic steering command value $\theta_{AD}$ to be provided to the integrated angle command value calculation unit 45 may be provided upstream of the integrated angle command value calculation unit 45. In steps S44, S47, the weight setting unit 54 may provide 0 or the current actual steering angle θ to the integrated angle command value calculation unit 45 via the automatic steering command value setting unit 55.

In the case where initial setting is performed in such a process, when determination is made in step S45 that the first lane change approval condition is satisfied (step S45: YES) and when determination is made in step S48 that the second lane change approval condition is satisfied (step S48: YES), the weight setting unit 54 needs to perform the following process. That is, the weight setting unit 54 controls the automatic steering command value setting unit 55 such that the automatic steering command value $\theta_{AD}$ (automatic steering command value $\theta_{AD}$ after the lane change) from the higher-level ECU 201 is provided to the integrated angle command value calculation unit 45.

In the present modification, the first and second lane change approval conditions in the weight setting process by the weight setting unit 54 are set based on the lateral deviation $e_L$, but the first and second lane change approval conditions may be set based on the difference ($\theta-\theta_{AD}$) between the actual steering angle θ and the automatic steering command value $\theta_{AD}$.

Specifically, in step S45 in FIG. 16, when the predetermined value C larger than 0 is the threshold value, the weight setting unit 54 may determine whether the first lane change approval condition of ($\theta-\theta_{AD}$)>C is satisfied. In step S48, the weight setting unit 54 may determine whether the second lane change approval condition of ($\theta-\theta_{AD}$)<−C is satisfied.

[9] Other Forms

Although the embodiment of the present invention is described above, the present invention may also be implemented in other forms. In the embodiment described above, the angle control unit 46 (see FIG. 5) includes the feedforward control unit 63. However, the feedforward control unit 63 may be omitted. In this case, the feedback control torque $T_{fb}$ calculated by the feedback control unit 62 is basic target torque.

In the embodiment described above, the disturbance torque estimation unit 64 estimates the disturbance torque $\hat{T}_{lc}$ based on the motor torque command value $T_{mcmd}$ and the rotational angle θ of the plant. However, a motor torque acquisition unit that acquires the motor torque generated by the electric motor 18 may be provided, and the motor torque acquired by the motor torque acquisition unit may be used instead of the motor torque command value $T_{mcmd}$.

The embodiment described above illustrates the case where the manual steering command value and the automatic steering command value are angle command values. However, the present invention is also applicable to a case where the manual steering command value and the automatic steering command value are torque command values.

The embodiment described above illustrates the example in which the present invention is applied to motor control for a column type EPS. However, the present invention is also applicable to motor control for an EPS other than the column type.

Although the embodiment of the present invention is described in detail above, this is merely a specific example used to clarify the technical content of the present invention. The present invention should not be construed as being limited to the specific example, and the scope of the present invention is limited only by the appended claims.

DESCRIPTION OF THE REFERENCE NUMERALS

1 . . . electric power steering system, 3 . . . steered wheel, 4 . . . steering operation mechanism, 18 . . . electric motor, 30 . . . direction change command input device, 43 . . . assist torque command value setting unit, 44 . . . manual steering command value generation unit, 45 . . . integrated angle command value calculation unit, 46 . . . angle control unit, 47 . . . torque control unit, 48 . . . road reaction force characteristic setting unit, 51 . . . first weight setting unit, 52 . . . second weight setting unit, 53 . . . addition unit, 54 . . . weight setting unit, 62 . . . feedback control unit, 63 . . . feedforward control unit, 64 . . . disturbance torque estimation unit (disturbance observer), 65 . . . torque addition unit, 66 . . . disturbance torque compensation unit, 201 . . . higher-level ECU, 202 . . . motor control ECU

The invention claimed is:

1. A motor control device that controls drive of an electric motor for steering angle control, the motor control device comprising:

a manual steering command value generation unit that generates a manual steering command value using steering torque;

an integrated angle command value calculation unit that calculates an integrated angle command value by adding the manual steering command value to an automatic steering command value for driving assistance; and a motor control unit that controls the electric motor based on the integrated angle command value, wherein the manual steering command value generation unit is configured to generate the manual steering command value based on an equation of motion including road reaction force characteristic coefficients, and the motor control device further includes a road reaction force characteristic change unit that, when a direction change command is input by a driver operation, increases a value of at least one road reaction force characteristic coefficient out of the road reaction force characteristic coefficients as compared to a value before the direction change command is input.

2. The motor control device according to claim 1, wherein:

the road reaction force characteristic coefficients include a virtual load spring stiffness coefficient and a virtual load viscous damping coefficient; and the road reaction force characteristic change unit is configured to, when the direction change command is input, increase a value of at least one of the virtual load spring stiffness coefficient and the virtual load viscous damping coefficient as compared to a value before the direction change command is input.

3. The motor control device according to claim 1, wherein the road reaction force characteristic change unit maintains the value of the at least one road reaction force characteristic coefficient out of the road reaction force characteristic coefficients at a value larger than the value before the direction change command is input during a period from a start of input of the direction change command to satisfaction of a lane change approval condition for switching the automatic steering command value from an automatic steering command value for causing a vehicle to travel along a current lane to an automatic steering command value for causing the vehicle to travel along an adjacent lane according to the direction change command.

4. The motor control device according to claim 3, wherein the lane change approval condition is set using a distance between a center line of the current lane and a reference position of the vehicle.

5. The motor control device according to claim 3, wherein the lane change approval condition is set using a difference between an actual steering angle and the automatic steering command value.

6. A motor control device that controls drive of an electric motor for steering angle control, the motor control device comprising:

an assist torque command value generation unit that generates an assist torque command value using steering torque;

a manual steering command value generation unit that generates a manual steering command value using the steering torque and the assist torque command value;

an integrated angle command value calculation unit that calculates an integrated angle command value by adding the manual steering command value to an automatic steering command value for driving assistance; and a switching unit that switches control between first control for controlling the electric motor based on the assist torque command value and second control for controlling the electric motor based on the integrated angle command value, wherein the switching unit is configured to switch the control to the second control when a direction change command is input by a driver operation while the control is the first control, and to switch the control to the first control when a predetermined condition is satisfied after the control is switched to the second control.

7. The motor control device according to claim 6, wherein after the control is switched to the second control, the switching unit maintains the second control at least until satisfaction of a lane change approval condition for switching the automatic steering command value from an automatic steering command value for causing a vehicle to travel along a current lane to an automatic steering command value for causing the vehicle to travel along an adjacent lane according to the direction change command.

* * * * *